(12) United States Patent
Yamakami et al.

(10) Patent No.: US 7,578,585 B2
(45) Date of Patent: Aug. 25, 2009

(54) THERMAL INK-JET INK AND INK CARTRIDGE USING THE INK

(75) Inventors: Hideki Yamakami, Yokohama (JP); Hiroshi Tomioka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 11/648,599

(22) Filed: Jan. 3, 2007

(65) Prior Publication Data

US 2007/0109390 A1    May 17, 2007

Related U.S. Application Data

(63) Continuation of application No. PCT/JP2006/314022, filed on Jul. 7, 2006.

(30) Foreign Application Priority Data

Jul. 8, 2005    (JP) ............................. 2005-200982

(51) Int. Cl.
    *G01D 11/00* (2006.01)
(52) U.S. Cl. ........................ 347/100; 347/95
(58) Field of Classification Search .................. 347/84, 347/20, 15, 100, 95, 96, 101; 106/31.13, 106/31.6, 31.27; 523/160
See application file for complete search history.

(56) References Cited

U.S. PATENT DOCUMENTS

| | | | |
|---|---|---|---|
| 4,719,477 A * | 1/1988 | Hess | 347/59 |
| 5,354,369 A | 10/1994 | Shimomura et al. | 106/31.43 |
| 5,380,358 A | 1/1995 | Aoki et al. | 106/31.43 |
| 5,686,951 A | 11/1997 | Koike et al. | 347/106 |
| 5,997,122 A | 12/1999 | Moriyama et al. | 347/11 |

(Continued)

FOREIGN PATENT DOCUMENTS

EP    1626070    2/2006

(Continued)

OTHER PUBLICATIONS

International Preliminary Report on Patentability dated Jan. 17, 2008, issued in corresponding PCT Application No. PCT/JP2006/314022, and English language translation thereof.

*Primary Examiner*—Manish S Shah
(74) *Attorney, Agent, or Firm*—Fitzpatrick, Cella, Harper & Scinto

(57) ABSTRACT

An ink cartridge includes a thermal ink-jet head provided with a heat generating portion that generates thermal energy for ejecting the ink from an ejection opening, in which: the heat generating portion has, on its surface in contact with the ink, a protective layer containing at least one selected from the group consisting of a silicon oxide, a silicon nitride, and a silicon carbide; and the ink contains a substance that dissolves the protective layer and a compound represented by $(R_2)_n$A—...—$N(R_1)C(O)R_3(R_4)$—(A) where A represents alkylene or alkenylene which forms a ring with a nitrogen atom, a carbonyl group and $R_3$, $R_1$ and $R_4$ each represent hydrogen atom, hydroxyl, alkyl, alkenyl, acyl, carbamoyl, carboxyl or sulfonyl, $R_2$ represents a group bonded to an arbitrary carbon atom of A and represents hydrogen atom, hydroxyl, alkyl, alkenyl, acyl, carbamoyl, carboxyl or sulfonyl, n represents 0 to 4, and $R_3$ represents carbon or nitrogen atom, and a content X (% by mass) of the compound satisfies $1 \leq X \leq 30$.

9 Claims, 4 Drawing Sheets

U.S. PATENT DOCUMENTS

| | | |
|---|---|---|
| 6,682,588 B2 | 1/2004 | Shioya et al. ............ 106/31.43 |
| 2007/0107627 A1 | 5/2007 | Negishi et al. ............ 106/31.27 |
| 2007/0109371 A1 | 5/2007 | Tomioka et al. ................ 347/86 |
| 2007/0109372 A1 | 5/2007 | Tomioka et al. ................ 347/86 |
| 2007/0109378 A1 | 5/2007 | Yamakami et al. ........... 347/100 |

FOREIGN PATENT DOCUMENTS

| | | |
|---|---|---|
| JP | 4-239650 | 8/1992 |
| JP | 5-330048 | 12/1993 |
| JP | 6-15949 | 1/1994 |
| JP | 6-25575 | 2/1994 |
| JP | 6-93218 | 4/1994 |
| JP | 6-108376 | 4/1994 |
| JP | 7-156402 | 6/1995 |
| JP | 2002-12803 | 1/2002 |
| WO | 2004/104108 | 5/2004 |

\* cited by examiner

THERMAL INK-JET INK AND INK CARTRIDGE USING THE INK

This application is a continuation of International Application No. PCT/JP2006/314022 filed on Jul. 7, 2006, which claims the benefit of Japanese Patent Application No. 2005-200982 filed on Jul. 8, 2005.

BACKGROUND OF THE INVENTION

1. Field of the Invention

The present invention relates to a thermal ink-jet ink having excellent storage stability and an ink cartridge for containing the ink.

2. Description of the Related Art

An ink-jet recording method is a recording method involving causing a small ink droplet to fly to plain paper or a dedicated glossy medium to form an image. The method has become rapidly widespread in association with advance of a reduction in price of a recording apparatus and an increase in recording rate of the apparatus. In particular, there has been a growing need for photograph picture quality because a digital camera has become widespread, so an additional improvement in image quality and printing at an additionally high speed have been requested. Accordingly, more sophisticated techniques than the conventional ones have been requested, and examples of the techniques include: a reduction in size of an ink droplet; an increase in density at which nozzles are arranged; an increase in length of a head in association with an increase in number of nozzles; and control of ejection of an ink droplet.

On the other hand, a thermal ink-jet recording mode is a mode involving: foaming ink by utilizing thermal energy; and ejecting the ink to a recording medium. The mode enables high-speed, high-density, high-definition, high-quality recording, and is suitable for colorization and a reduction in size of a recording apparatus. A general head to be used in the recording mode includes: a substrate for an ink-jet recording head on which a heat element for foaming ink and wiring to be electrically connected to the heat element are produced; and a flow path for ejecting the ink on the substrate.

In addition, the substrate for an ink-jet recording head is modified in various ways in order that electrical energy to be inputted may be saved and a reduction in lifetime of the substrate resulting from destruction of a heat generating portion in association with the foaming of ink may be prevented. In particular, a protective layer for protecting a heat element placed between a pair of wiring patterns from ink is modified in many ways.

It is advantageous for the protective layer to have a high thermal conductivity or a small thickness from the viewpoint of thermal efficiency. However, it is advantageous for the protective layer to have a large thickness from the viewpoint of protection of wiring to be connected to the heat element from ink. Accordingly, the thickness of the protective layer must be set to an optimum thickness from the viewpoints of energy efficiency and reliability. In particular, a layer in contact with ink are affected by both of cavitation damage due to the foaming of the ink, that is, mechanical damage, and damage due to a chemical reaction with an ink component at high temperature, that is, chemical damage, so influences of the mechanical damage and the chemical damage need to be sufficiently taken into consideration.

In view of the foregoing, the protective layer of an ink-jet substrate generally has a layer having high stability against mechanical damage and chemical damage as an upper layer (i.e., layer in contact with ink), and an insulating layer for protecting wiring as a lower layer. To be specific, in general, a Ta layer, which is a layer extremely stable both mechanically and chemically, is formed as the upper layer, and an SiN layer, SiO layer, or SiC layer, which can be easily formed by using an existing semiconductor producing device and is stable, is formed as the lower layer.

Detailed description of the foregoing is as described below. An SiN layer having a thickness in the range of from about 0.2 µm or more to 1 µm or less is formed as a protective layer on wiring, and then a protective layer as an upper layer is formed. A Ta layer has a thickness in the range of from 0.2 µm to 0.5 µm, which is referred to as a cavitation resisting layer, is formed as the upper layer because the layer serves as a layer to cope with cavitation damage. With this constitution, compatibility between the lifetime and reliability of a heat element of an ink-jet substrate is achieved.

Japanese Patent Application Laid-Open No. H05-330048 discloses, as an ink-jet technique using a thermal head, an ink-jet head using a material containing Si, N, or Ir at a specific ratio for a heat element to improve durability and thermal conversion efficiency. There is also disclosed an ink containing a chelating reagent at a specific concentration from the viewpoints of improvement in ejection durability of a thermal head and in suppression of a kogation to be deposited at a heat generating portion due to ejection (see Japanese Patent Application Laid-Open No. H06-093218). There is also disclosed an ink containing an ammonium salt of an acid having a methyl group or a methylene group, and a carboxyl group (see Japanese Patent Application Laid-Open No. 2002-012803). Those conventional arts each relate to suppression of erosion of a Ta layer in association with ejection duration or the suppression of a kogation to be deposited on the Ta layer when the Ta layer is arranged as the surface layer of the protective layer of a heat generating portion. In addition, ink contains a specific compound at a specific concentration, whereby a balance between the deposition of a kogation and the erosion of the Ta layer due to ejection duration is optimized for the lengthening of the lifetime of the ink.

SUMMARY OF THE INVENTION

In the case of an ink cartridge in which an ink-jet head is directly mounted on an ink tank so that the head and the ink tank are integrated with each other, the head needs to be directly implemented on a plastic casing of which the ink cartridge is constituted in terms of cost and production. Accordingly, the adoption of such the ink-jet head according to a thermal mode as described above is apt to cause heat accumulation resulting from foaming in association with increases in number of nozzles and in density at which the nozzles are arranged, so thermal efficiency is lost in some cases. In addition, a constitution having high thermal efficiency is requested from the viewpoint of the savings of electrical energy to be inputted.

In view of the foregoing, the inventors of the present invention have examined to constitute the protective layer by only an insulating layer as a lower layer mainly composed of a silicon nitride, a silicon oxide, or a silicon carbide such as SiN, SiO, or SiC instead of the upper layer and the lower layer by removing the upper layer from the protective layer. Such the constitution is advantageous for thermal efficiency, and is advantageous for the suppression of: a reduction in yield due to a defect of the layer; and an increase in cost as well because the constitution is a simple layer constitution. The constitution is advantageous for durability against cavitation damage as well because thermal efficiency improves and electrical energy to be inputted can be therefore reduced. That is, the constitution of the protective layer by only an insulating layer that has been conventionally a lower layer as described above is preferable for an integrated ink cartridge having an ink-jet head according to a thermal mode.

However, as a result of further detailed investigation, the inventors of the present invention have found that an ink-jet head according to a thermal mode with the constitution involves the following new problem. That is, the inventors have newly revealed that an insulating protective layer of a silicon nitride, a silicon oxide, or a silicon carbide as a main component is dissolved in ink and the thickness of the protective layer reduces during long-term storage not involving foaming and assuming, for example, physical distribution. In addition, the reduction in thickness of the protective layer increases foaming energy to be applied to the ink, so image deterioration in association with an ejection failure due to abnormal foaming and a reduction in printing durability due to an abnormal increase in temperature of a heat generating portion are apt to occur upon application of a driving pulse to the head. This is a first problem of the present invention.

The above-mentioned phenomenon is considered to occur via a mechanism different from: a thermal shock at high temperature and high pressure due to a conventionally known foaming phenomenon; and corrosion of a heat generating portion due to cavitation and the like. Investigation conducted by the inventors of the present invention shows that there is no correlation between the durability of a heat generating portion due to foaming and the dissolution of an insulating protective layer due to the above-mentioned physical distribution storage not involving foaming. Even in a combination of ink and a head each having sufficient ejection durability due to foaming, the storage stability of the ink deteriorates owing to the above-mentioned dissolution phenomenon in some cases.

On the other hand, ink may contain a polyvalent metal eluted from a member with which an impurity of a material of which the ink is constituted or the ink contacts. The inventors of the present invention have confirmed that the polyvalent metal precipitates at a nozzle portion of an ink-jet head to be responsible for an ejection failure of the ink. In particular, now that an improvement in image quality has advanced, additional increases in number of nozzles and in density at which the nozzles are arranged are advancing in an ink-jet head. In addition, an ejection failure of ink largely affects the formation of an image particularly in such the head, so the ejection failure of the ink must be prevented as much as possible. The inventors of the present invention have defined the prevention of the ejection failure of the ink as a second problem of the present invention.

Further, the inventors of the present invention have found that ink containing a specific colorant dissolves the above-mentioned insulating protective layer. A colorant in ink is selected while emphasis is placed on its weatherability and color development property because the colorant is an important factor having a significant influence on the image property of a printer. Accordingly, a colorant credited with an ability to improve the quality of an ink-jet recorded image dissolves the insulating protective layer to reduce the thickness of the protective layer in some cases. In addition, the reduction in thickness of the protective layer increases foaming energy to be applied to the ink, so image deterioration in association with an ejection failure due to abnormal foaming and a reduction in printing durability due to an abnormal increase in temperature of a heat generating portion are apt to occur upon application of a driving pulse to a head. This is a third problem of the present invention.

The objects described above are attained by the present invention as described below. According to one aspect of the present invention, there is provided an ink cartridge for storing ink including a thermal ink-jet head provided with a heat generating portion that generates thermal energy for ejecting the ink from an ejection opening, in which the heat generating portion has, on its surface in contact with the ink, a protective layer containing at least one selected from the group consisting of a silicon oxide, a silicon nitride, and a silicon carbide, and the ink contains a substance that dissolves the protective layer and a compound represented by the following general formula (1), and a content X (% by mass) of the compound represented by the general formula (1) in the ink satisfies a relationship of $1 \leq X \leq 30$:

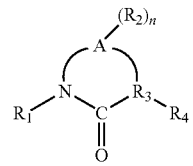

Formula (1)

where A represents an alkylene or alkenylene group having 1 to 4 carbon atoms which forms a ring with a nitrogen atom, a carbonyl group and $R_3$, $R_1$ and $R_4$ each independently represent any one of a hydrogen atom, a hydroxyl group, a substituted or unsubstituted alkyl group, a substituted or unsubstituted alkenyl group, a substituted or unsubstituted acyl group, a carbamoyl group, a substituted or unsubstituted carboxyl group, and a substituted or unsubstituted sulfonyl group, $R_2$ represents a group bonded to an arbitrary carbon atom of A, $R_2$ representing any one of a hydrogen atom, a hydroxyl group, a substituted or unsubstituted alkyl group, a substituted or unsubstituted alkenyl group, a substituted or unsubstituted acyl group, a carbamoyl group, a substituted or unsubstituted carboxyl group, and a substituted or unsubstituted sulfonyl group, n represents an integer of 0 to 4, and $R_3$ represents a carbon or nitrogen atom.

According to another aspect of the present invention, there is provided an ink for a thermal ink-jet head provided with a heat generating portion that generates thermal energy for ejecting the ink from an ejection opening, the heat generating portion having on its surface in contact with the ink, a protective layer containing at least one selected from the group consisting of a silicon oxide, a silicon nitride, and a silicon carbide, the ink including a substance that dissolves the protective layer and a compound represented by the following general formula (1), in which a content X (% by mass) of the compound represented by the general formula (1) in the ink satisfies a relationship of $1 \leq X \leq 30$:

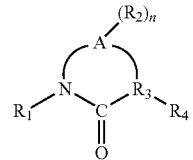

Formula (1)

where A represents an alkylene or alkenylene group having 1 to 4 carbon atoms which forms a ring with a nitrogen atom, a carbonyl group and $R_3$, $R_1$ and $R_4$ each independently represent any one of a hydrogen atom, a hydroxyl group, a substituted or unsubstituted alkyl group, a substituted or unsubstituted alkenyl group, a substituted or unsubstituted acyl group, a carbamoyl group, a substituted or unsubstituted carboxyl group, and a substituted or unsubstituted sulfonyl group, $R_2$ represents a group bonded to an arbitrary carbon atom of A, $R_2$ representing any one of a hydrogen atom, a hydroxyl group, a substituted or unsubstituted alkyl group, a substituted or unsubstituted alkenyl group, a substituted or unsubstituted acyl group, a carbamoyl group, a substituted or unsubstituted carboxyl group, and a substituted or unsubstituted sulfonyl group, n represents an integer of 0 to 4, and $R_3$ represents a carbon or nitrogen atom.

According to the present invention, there are provided: an ink-jet ink which shows a small change in driving pulse and a small change in an image to be outputted, provides sufficient ejection property and sufficient printing durability, shows a small temperature increase in association with printing, and is capable of stably forming a good image even after physical distribution or long-term storage in, for example, a state where the ink is mounted on a recording apparatus in the case of the application of the ink to an ink-jet head according to a thermal mode in which a protective layer provided for a surface in contact with the ink is constituted only of an insulating protective layer containing any one of a silicon oxide, a silicon nitride, and a silicon carbide; and an ink cartridge.

DESCRIPTION OF THE EMBODIMENTS

Figure 1:
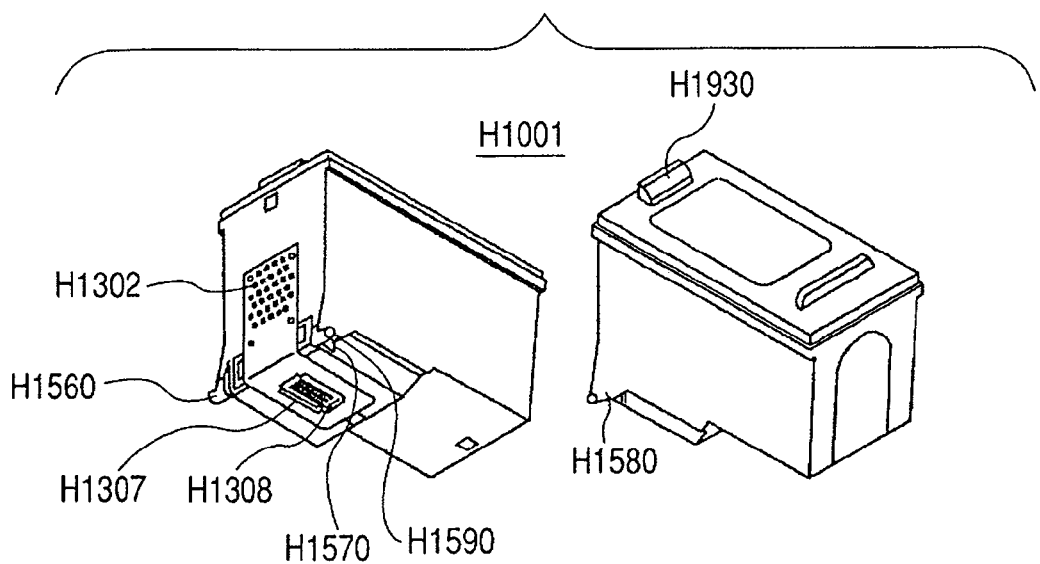
FIG. 1 is a perspective view of a recording head (i.e., ink cartridge).

The inventors of the present invention have found a specific compound that suppresses the dissolution of a protective layer very well. In addition, it has found that the coexistence of the specific compound and a substance that dissolves the protective layer in ink can prevent image deterioration due to a reduction in thickness of the protective layer and a reduction in printing durability as well as maintain even ejection reliability, and the present invention is completed.

Hereinafter, the present invention will be described in more detail by way of a preferred embodiment.

(Ink)

An ink of the present invention can effectively suppress the dissolution of a protective layer formed of a material containing a silicon nitride, a silicon oxide, or a silicon carbide even when the ink contacts with the protective layer for a long time period. Further, the ink is excellent because the ink can suppress even a detrimental effect due to the elution of a polyvalent metal, and, at the same time, maintains a high level of ejection reliability. Hereinafter, a component of the ink according to the present invention will be described in detail.

(Substance that Dissolves Protective Layer)

Judgment as to whether a certain substance corresponds to a "substance that dissolves a protective layer" of the present invention is performed as described below. First, an SiN layer having a thickness of 400 nm is formed on the surface of a silicon wafer measuring 11 mm by 5 mm. Next, the silicon wafer having the SiN layer is immersed in a 50-mmol/l solution of a substance to be judged in a closed vessel at a temperature of 60° C. 1 week after that, the silicon wafer having the SiN layer is taken out, washed with pure water, and dried, and then the thickness of the SiN layer is measured. A substance that is found as a result of the measurement to reduce the thickness of the SiN layer by 5% or more after the immersion as compared to the thickness before the immersion is defined as a "substance that dissolves a protective layer" of the present invention. It should be noted that the thickness of the SiN layer can be measured by an ordinary method. For example, the thickness can be measured by using a non-contact type thickness measuring apparatus (trade name: NANOSPEC/AFT Model 210, manufactured by Nanometorics Japan, Ltd.).

The inventors of the present invention have experimentally confirmed that the above-mentioned test condition substantially corresponds to a state where an ink cartridge holding ink is stationarily kept for about 2 years. In addition, it has confirmed that the above-mentioned test condition is substantially identical to a condition of 60° C. for 30 days, that is a condition under which an ink cartridge in any one of examples to be shown below is stored. Accordingly, 1 week, that is a period for which the silicon wafer is immersed in the solution in the above-mentioned test condition, is shorter than 30 days, that is the period of the storage test of an ink cartridge performed in any one of the examples. The inventors of the present invention consider a reason for the difference between the periods to be as described below. In the above-mentioned test condition, a value for the volume of the above-mentioned solution containing a substance that dissolves a protective layer is not specified because the volume is increased in such a manner that the dissolution of the SiN layer is not affected by an increase in concentration of chemical species in the solution due to the dissolution. Meanwhile, an ink volume in contact with a protective layer in an actual ink cartridge is finite and extremely small as compared to the volume of the solution in the test condition, so the concentration of chemical species to be dissolved increases. As a result, the rate at which the protective layer is dissolved is slow, so it is assumed that the period of the storage test must be set to be longer than the period for which the silicon wafer is immersed in the solution in the above-mentioned test condition.

A substance that dissolves a protective layer is not particularly limited as long as the substance satisfies the above-mentioned condition. Examples of a specific substance found by the inventors of the present invention include the following compounds (3) and (4) each of which may be incorporated as a colorant into ink in some cases. Details about the mechanism via which those colorants each dissolve a protective layer are unclear. However, the inventors of the present invention assume that a specific site at each of the above-mentioned colorants chelates with silicon serving as a component of the protective layer to cause a reduction in thickness of the layer.

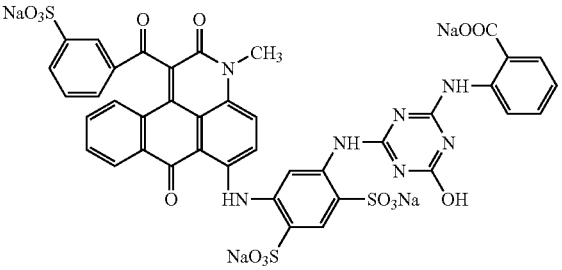

Compound (3)

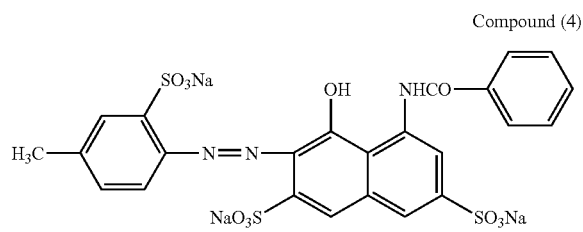

Compound (4)

Further, the inventors of the present invention have made extensive studies on the mechanism via which a substance that dissolves a protective layer except a colorant among components to be incorporated into ink dissolves the protective layer. As a result, it has found that a substance that forms a chelating compound with silicon ionizes silicon in the protective layer to dissolve silicon in the ink, so the protective layer is eroded, and hence the thickness of the layer reduces.

Accordingly, the inventors of the present invention have conducted investigation into a compound that easily forms a chelating compound with silicon that is a component of which the protective layer is formed. As a result, it has been revealed that the dissolution of the protective layer significantly occurs during physical distribution storage when ink contains a polyvalent carboxylic acid or a salt thereof. Specific examples of the polyvalent carboxylic acid or the salt thereof include citric acid, oxalic acid, malonic acid, maleic acid, succinic acid, fumaric acid, itaconic acid, phthalic acid, isophthalic acid, terephthalic acid, adipic acid, sebacic acid, dimer acid, pyromellitic acid, trimellitic acid, gluconic acid, and EDTA, and salts thereof. Specific examples of the salts include: salts of alkali metals or alkali earth metals; ammonium salts; and primary, secondary, and tertiary amine salts. Of those, citric acid and a salt thereof are particularly preferable.

It should be noted that, in the present invention, although a colorant, or part of carboxylic acids or a salt is present in an ionic state in ink, this state is represented by using the phrase "contains a colorant", "contains an acid", or "contains a salt" for convenience.

(Compound that Suppresses Dissolution of Protective Layer)

The inventors of the present invention have made extensive studies on a compound that suppresses the dissolution of a protective layer provided for a surface where a heat generating portion contacts with ink. As a result, it has found that the compound represented by the above-mentioned general formula (1) can effectively suppress the dissolution of the protective layer. The mechanism via which the compound suppresses the dissolution of the protective layer is unclear. However, the inventors of the present invention assume the mechanism to be as follows: the polarity possessed by the compound represented by the general formula (1) has such an appropriate value that the compound interacts with silicon in the protective layer without chelating with silicon in the protective layer, so the compound is attracted toward the vicinity of the surface of the protective layer to protect the surface of the protective layer. As a result, the substance that dissolves the protective layer can be effectively prevented from chelating with silicon.

In addition, the compound represented by the general formula (1) is capable of effectively preventing the clogging of a nozzle opening due to the precipitation of a colorant or the like as a result of long-term storage and the deterioration in intermittent ejection property due to an increase in viscosity of ink in association with the evaporation of moisture as well because the compound is excellent also in moisture retention and solubility in the colorant or the like. However, the solubility in the colorant or the like is apt to reduce in association with an increase in molecular weight of the compound represented by the general formula (1). As a result, a problem in that a nozzle opening clogs owing to long-term storage may occur. Further, the number of moles of a compound having such a high molecular weight becomes smaller than that of a compound having a low molecular weight when the compound having such a high molecular weight is incorporated into ink at a predetermined mass concentration. As a result, even when a molecule of the compound having such a high molecular weight has moisture retention, a new problem is predicted, in which the evaporation of moisture or a reduction in intermittent ejection property in association with the fact that the compound having such a high molecular weight is relatively inferior to the compound having a low molecular weight in moisture retaining ability is apt to occur. From such viewpoint, the inventors of the present invention have found that a compound represented by the following general formula (2) is more preferable as a compound that suppresses the dissolution of a protective layer:

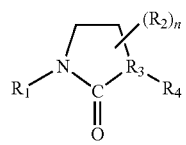

Formula (2)

where $R_1$ and $R_4$ each represent any one of a substituted or unsubstituted alkyl group having 1 to 4 carbon atoms, a hydrogen atom, a hydroxyl group, a carboxyl group, and a sulfonyl group, $R_2$ represents a group bonded to a nitrogen atom, carbonyl group, or carbon atom except $R_3$ of which a five-membered ring is constituted, $R_2$ representing any one of a hydrogen atom, a hydroxyl group, a substituted or unsubstituted alkyl group having 1 to 4 carbon atoms, a carboxyl group, and a sulfonyl group, n represents an integer of 0 to 4, and $R_3$ represents a carbon or nitrogen atom.

Preferable examples of the compound represented by the general formula (2) include ethylene urea, 2-pyrrolidone, 2-pyrrolidone-1-(2-hydroxyethyl), and dimethylimidazolidinone.

It is difficult to suppress the dissolution of a protective layer when each of the above-exemplified substances to be used in the present invention, each of which suppresses the dissolution of the protective layer, is added in an extremely small amount. In contrast, when each of the substances is added in an extremely large amount, it becomes difficult to maintain a high level of ejection reliability through a combination with a colorant or the like. Therefore, the concentration of a substance that suppresses the dissolution of a protective layer to be incorporated into ink must be controlled to fall within a certain range in order that the ejection reliability of the ink may be maintained and the dissolution of the protective layer may be effectively suppressed. To be specific, when ink contains a substance that dissolves a protective layer, the content X (% by mass) of the compound represented by the general formula (1) in the ink satisfies the relationship of $1 \leq X \leq 30$. When the content of the compound represented by the general formula (1) is smaller than 1% by mass with respect to the total amount of the ink, it becomes difficult to suppress the dissolution of the protective layer effectively. When the content is larger than 30% by mass with respect to the total amount of the ink, it becomes difficult to maintain the ejection reliability of the ink.

Meanwhile, it has been revealed that a polycarboxylic acid and a salt thereof in a substance that dissolves a protective layer significantly dissolve the protective layer during physical distribution storage. However, the polycarboxylic acid and the salt thereof each act to capture a trace amount of a metal ion or the like to be eluted from a member in contact with ink upon charging and storage of the ink in an ink tank and to dissolve the metal ion or the like in the ink stably. This action has, for example, a suppressing effect on the precipitation of an insolubilized hydroxide or oxide of a metal at a nozzle ejection opening portion in, for example, the case where a head is mounted on a printer main body and left for a long period of time that brings a nozzle into a dry state or the case where a state in which an unused nozzle dries at the time of continuous printing is repeated.

Figure 8:
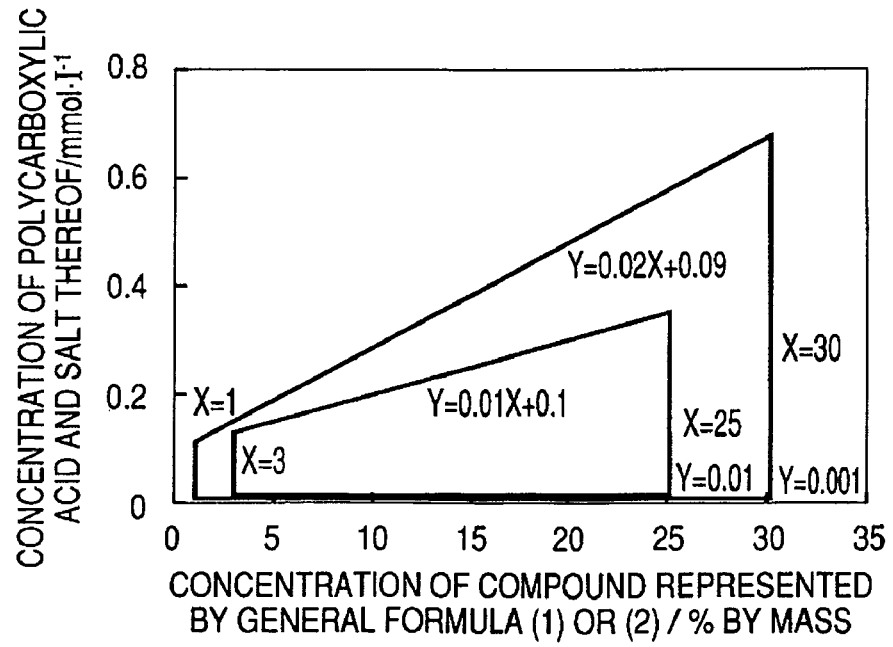
FIG. 8 is a view showing the concentration of a compound represented by a general formula (1) or (2) and the concentration of a polycarboxylic acid to be suitably used.

The inventors of the prevent invention have found that, when a polycarboxylic acid and a salt thereof each serving as a substance that dissolves a protective layer are incorporated into ink, compatibility between the suppression of the dissolution of the protective layer due to long-term storage and a reduction in deterioration of ejection stability resulting from an impurity eluted from an ink tank must be achieved. To achieve the compatibility, the inventors of the present invention have found that there is a preferable relationship between the concentration of a substance that dissolves the protective layer in the ink and the concentration of a compound that suppresses the dissolution of the protective layer in the ink. To be specific, the content X (% by mass) of the compound represented by the general formula (1) serving as a compound that suppresses the dissolution of the protective layer in the ink and the content Y (mmol/l) of the polycarboxylic acid and the salt thereof preferably satisfy the relationship of $0.001 \leq Y \leq 0.02X+0.09$. The range corresponds to the range of an outer trapezoid in FIG. 8.

Further, the thickness of a protective layer containing a silicon oxide, a silicon nitride, or a silicon carbide to be in direct contact with the ink of a head heat generating portion to be described later is preferably 50 nm or more to 500 nm or less from the viewpoints of thermal conversion efficiency and durability. In the thickness range, thermal conversion efficiency is sensitively susceptible to a reduction in thickness due to the dissolution of the protective layer in the ink. As a result, detrimental effects such as abnormal foaming and a large change in amount of the ink to be ejected or in rate at which the ink is ejected are apt to occur. From this viewpoint, the content X (% by mass) of the compound represented by the general formula (1) described above particularly preferably satisfies the relationship of $3 \leq X \leq 25$. In addition, the content Y (mmol/l) of the polycarboxylic acid and the salt thereof particularly preferably satisfies the relationship of $0.01 \leq Y \leq 0.01X+0.1$. The range corresponds to the range of an inner trapezoid in FIG. 8.

Hereinafter, any other component in the ink of the present invention will be described in detail.

(Colorant)

Preferable examples of the colorant to be incorporated into the ink according to the present invention are given below, but the colorant is not limited to the following.

C.I. Direct Yellow: 8, 11, 12, 27, 28, 33, 39, 44, 50, 58, 85, 86, 87, 88, 89, 98, 100, 110, 132, 173, and the like C.I. Acid Yellow: 1, 3, 7, 11, 17, 23, 25, 29, 36, 38, 40, 42, 44, 76, 98, 99, and the like C.I. Food Yellow: 3 and the like C.I. Pigment Yellow: 1, 2, 3, 12, 13, 14, 15, 16, 17, 73, 74, 75, 83, 93, 95, 97, 98, 114, 128, 138, 180, and the like C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, and the like C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, and the like C.I. Food Red: 87, 92, 94, and the like C.I. Direct Violet: 107 and the like C.I. Pigment Red: 2, 5, 7, 12, 48:2, 48:4, 57:1, 112, 122, 123, 168, 184, 202, and the like C.I. Direct Blue: 1, 15, 22, 25, 41, 76, 77, 80, 86, 90, 98, 106, 108, 120, 158, 163, 168, 199, 226, 307, and the like C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244, and the like C.I. Pigment Blue: 1, 2, 3, 15, 15:2, 15:3, 15:4, 16, 22, 60, and the like C.I. Acid Orange: 7, 8, 10, 12, 24, 33, 56, 67, 74, 88, 94, 116, 142, and the like C.I. Acid Red: 111, 114, 266, 374, and the like C.I. Direct Orange: 26, 29, 34, 39, 57, 102, 118, and the like C.I. Food Orange: 3 and the like C.I. Reactive Orange: 1, 4, 5, 7, 12, 13, 14, 15, 16, 20, 29, 30, 84, 107, and the like C.I. Disperse Orange: 1, 3, 11, 13, 20, 25, 29, 30, 31, 32, 47, 55, 56, and the like C.I. Pigment Orange: 43 and the like C.I. Pigment Red: 122, 170, 177, 194, 209, 224, and the like C.I. Acid Green: 1, 3, 5, 6, 9, 12, 15, 16, 19, 21, 25, 28, 81, 84, and the like C.I. Direct Green: 26, 59, 67, and the like C.I. Food Green: 3 and the like C.I. Reactive Green: 5, 6, 12, 19, 21, and the like C.I. Disperse Green: 6, 9, and the like C.I. Pigment Green: 7, 36, and the like C.I. Acid Blue: 62, 80, 83, 90, 104, 112, 113, 142, 203, 204, 221, 244, and the like C.I. Reactive Blue: 49 and the like C.I. Acid Violet: 17, 19, 48, 49, 54, 129, and the like C.I. Direct Violet: 9, 35, 47, 51, 66, 93, 95, 99, and the like C.I. Reactive Violet: 1, 2, 4, 5, 6, 8, 9, 22, 34, 36, and the like C.I. Disperse Violet: 1, 4, 8, 23, 26, 28, 31, 33, 35, 38, 48, 56, and the like C.I. Pigment Blue: 15:6 and the like C.I. Pigment Violet: 19, 23, 37, and the like C.I. Direct Black: 17, 19, 22, 31, 32, 51, 62, 71, 74, 112, 113, 154, 168, 195, and the like C.I. Acid Black: 2, 48, 51, 52, 110, 115, 156, and the like C.I. Food Black: 1, 2, and the like Carbon black In addition, examples of other colorants which can be preferably used in the present invention include colorants each represented by any one of the following general formulae (5) to (11):

General formula (5)

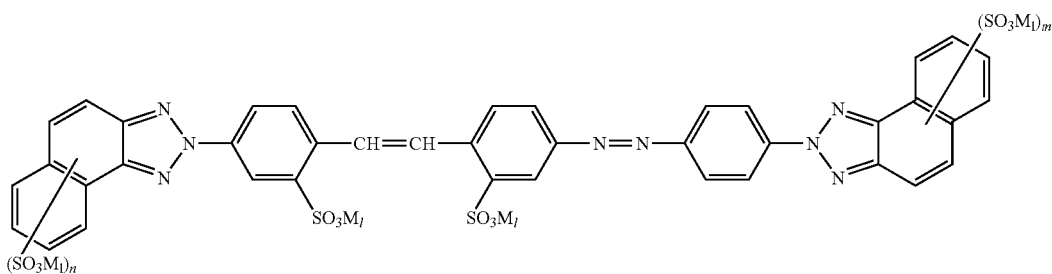

where each m independently represents 1 or 2, and each $M_1$ independently represents a hydrogen atom, an alkali metal, an alkali earth metal, or a cation or ammonium ion of an organic amine.

Specific suitable examples of the structure of the colorant represented by the general formula (5) include, but not particularly limited to, such structures as shown in Table 1 below. For convenience, cyclic structures at both terminals of the general formula (5) are defined as an A ring and a B ring, and a substitution position is defined as shown in the following general formula (6). Numbers shown in Table 1 below each represent the substitution position of a sulfonic group in each of Exemplified Compounds Y1 to Y5:

General formula (6)

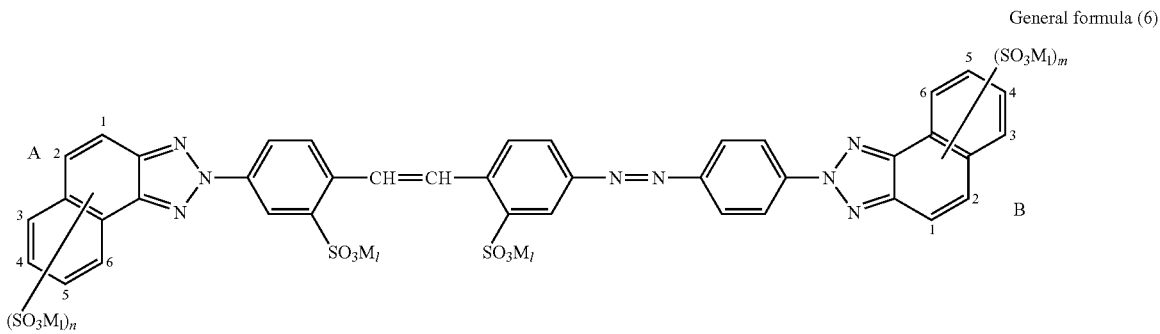

where each m independently represents 1 or 2, and each $M_1$ independently represents a hydrogen atom, an alkali metal, an alkali earth metal, or a cation or ammonium ion of an organic amine.

TABLE 1

Exemplified Compounds Y1 to Y4

| No. | Position of substituent of A ring | Position of substituent of B ring |
|---|---|---|
| Y1 | 2 | 4 |
| Y2 | 4 | 4 |

TABLE 1-continued

Exemplified Compounds Y1 to Y4

| No. | Position of substituent of A ring | Position of substituent of B ring |
|---|---|---|
| Y3 | 2 | 4, 6 |
| Y4 | 4, 6 | 4 |

Specific suitable examples of the structure of the colorant represented by the general formula (6) include, but not particularly limited to, Exemplified Compound Y1 as shown in the following formula.

Exemplified Compound Y1

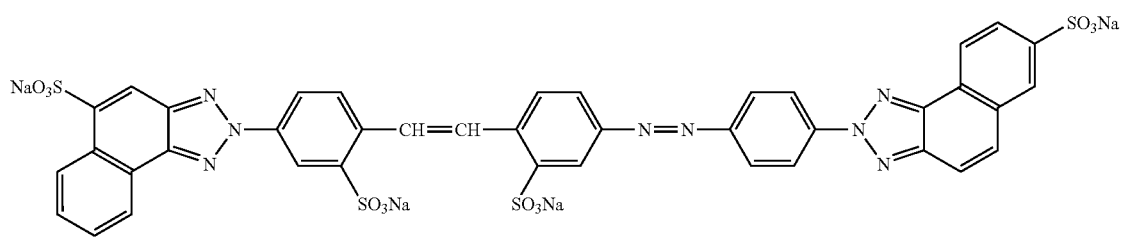

Other examples of a yellow-based colorant include compounds having structures described in WO 99/43754 and WO 02/081580:

General formula (7)

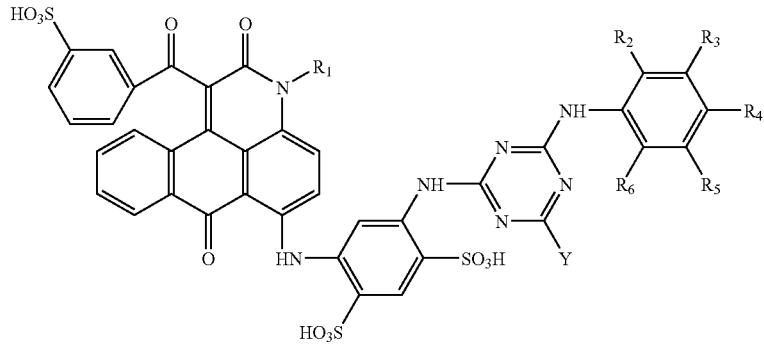

where $R_1$ represents any one of a hydrogen atom, an alkyl group, a hydroxy lower alkyl group, a cyclohexyl group, a monoalkyl aminoalkyl or dialkyl aminoalkyl group, and a cyano lower alkyl group, Y represents any one of a chlorine atom, a hydroxyl group, an amino group, and a monoalkylamino or dialkylamino group (which may have a substituent selected from the group consisting of a sulfonic group, a carboxyl group, and a hydroxyl group on the alkyl group), and $R_2$, $R_3$, $R_4$, $R_5$, and $R_6$ each independently represent any one of a hydrogen atom, an alkyl group having 1 to 8 carbon atoms, and a carboxyl group provided that $R_2$, $R_3$, $R_4$, $R_5$, and $R_6$ do not simultaneously represent hydrogen atoms.

Preferable specific examples of the colorant represented by the general formula (7) include Exemplified Compounds M1 to M7 having the following structures in free acid forms. In the present invention, Exemplified Compound M7 among those compounds is particularly preferably used:

Exemplified Compound M1

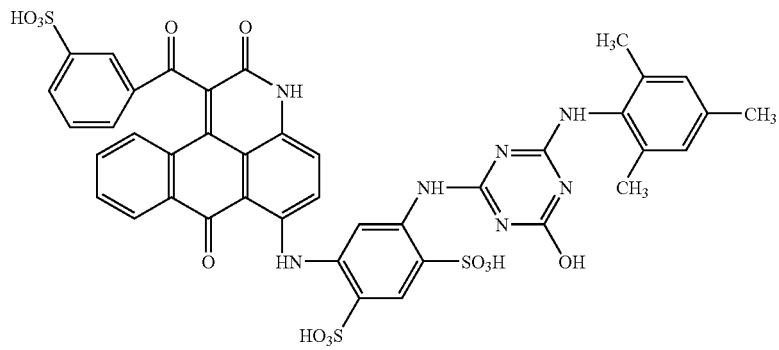

Exemplified Compound M2

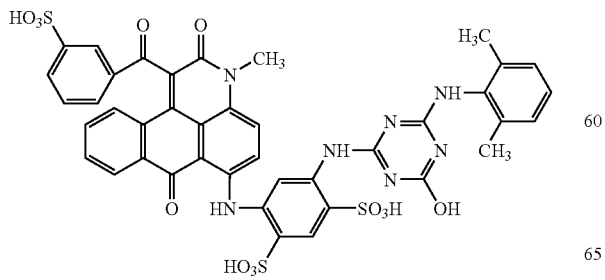

Exemplified Compound M3
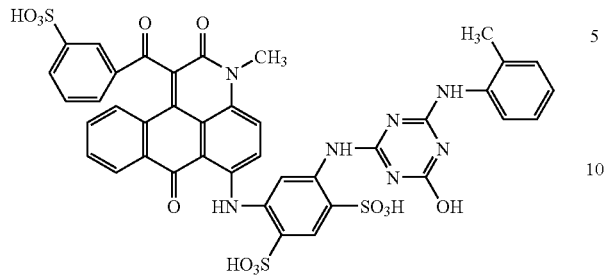
Exemplified Compound M4
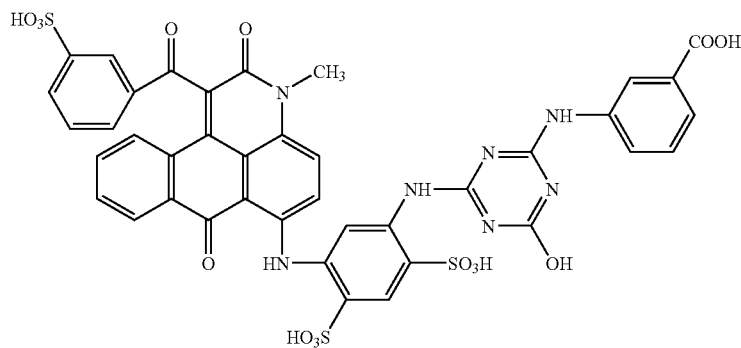
Exemplified Compound M5
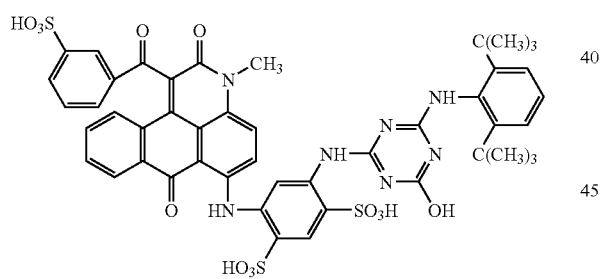
Exemplified Compound M7
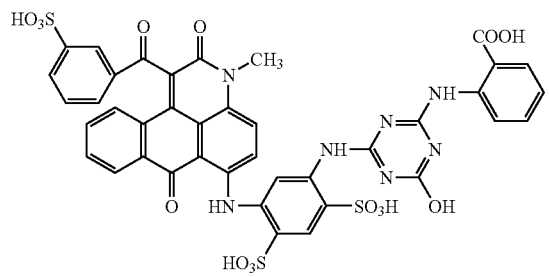
Exemplified Compound M6
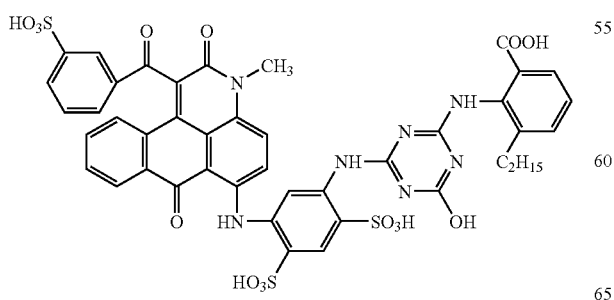

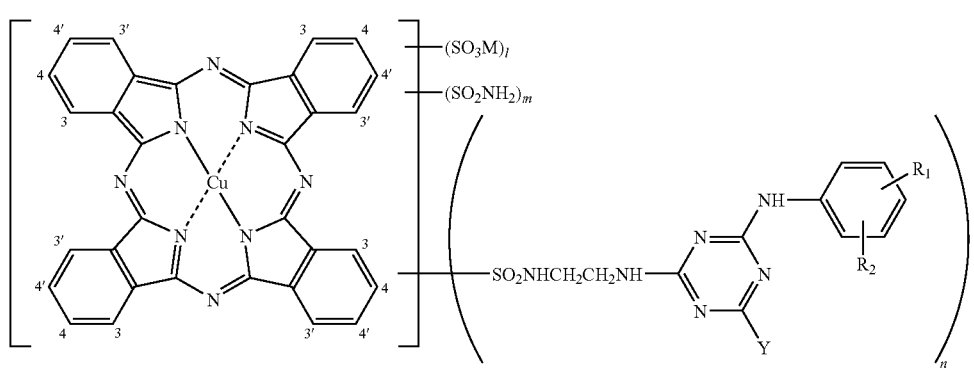

General formula (8)

where l=0 to 2, m=1 to 3, and n=1 to 3 provided that l+m+n=3 or 4, the substitution position of a substituent is 4- or 4'-position, M represents an alkali metal or ammonium, $R_1$ and $R_2$ each independently represent any one of a hydrogen atom, a sulfonic group, and a carboxyl group provided that $R_1$ and $R_2$ do not simultaneously represent hydrogen atoms, and Y represents any one of a chlorine atom, a hydroxyl group, an amino group, and a monoalkylamino or dialkylamino group.

Of the colorants each represented by the general formula (8), a phthalocyanine compound which is obtained by: using a 4-sulfophthalic acid derivative or a phthalocyanine compound, which is obtained by causing a 4-sulfophthalic acid derivative and a phthalic acid derivative (or a phthalic anhydride derivative) to react with each other in the presence of a metal compound, as a raw material; and causing the raw material to react with an aminating agent in the presence of an organic amine after the transformation of a sulfonic group into a chlorosulfone group is preferably used. That is, it has been found that. ink using a phthalocyanine compound obtained by introducing an unsubstituted sulfamoyl group ($—SO_2NH_2$) and a substituted sulfamoyl group [the following general formula (9)] into only 4- and 4'-positions in the formula (8) is extremely excellent in environmental gas resistance:

General formula (9)

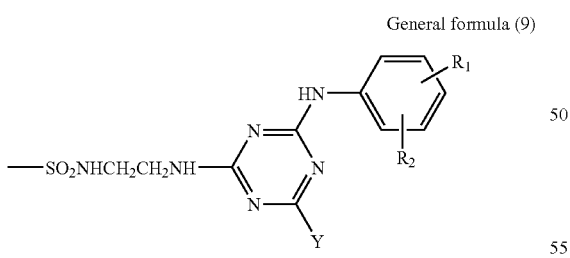

where $R_1$ and $R_2$ each independently represent any one of a hydrogen atom, a sulfonic group, and a carboxyl group provided that $R_1$ and $R_2$ do not simultaneously represent hydrogen atoms, and Y represents any one of a chlorine atom, a hydroxyl group, an amino group, and a monoalkylamino or dialkylamino group.

Preferable specific examples of the group represented by the general formula (9) include groups having the following structures in free acid forms. Of those, Exemplified Compound C1 is particularly preferably used:

Exemplified Compound C1

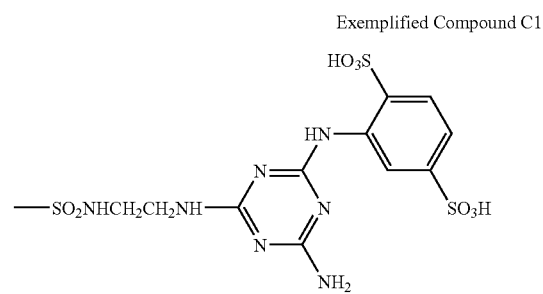

Exemplified Compound C2

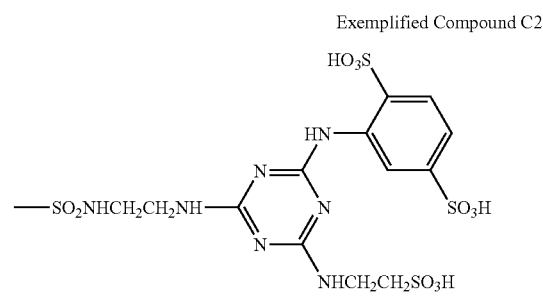

Exemplified Compound C3

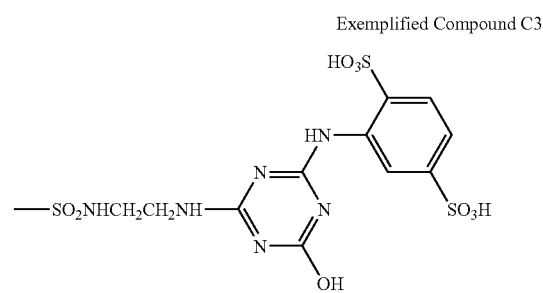

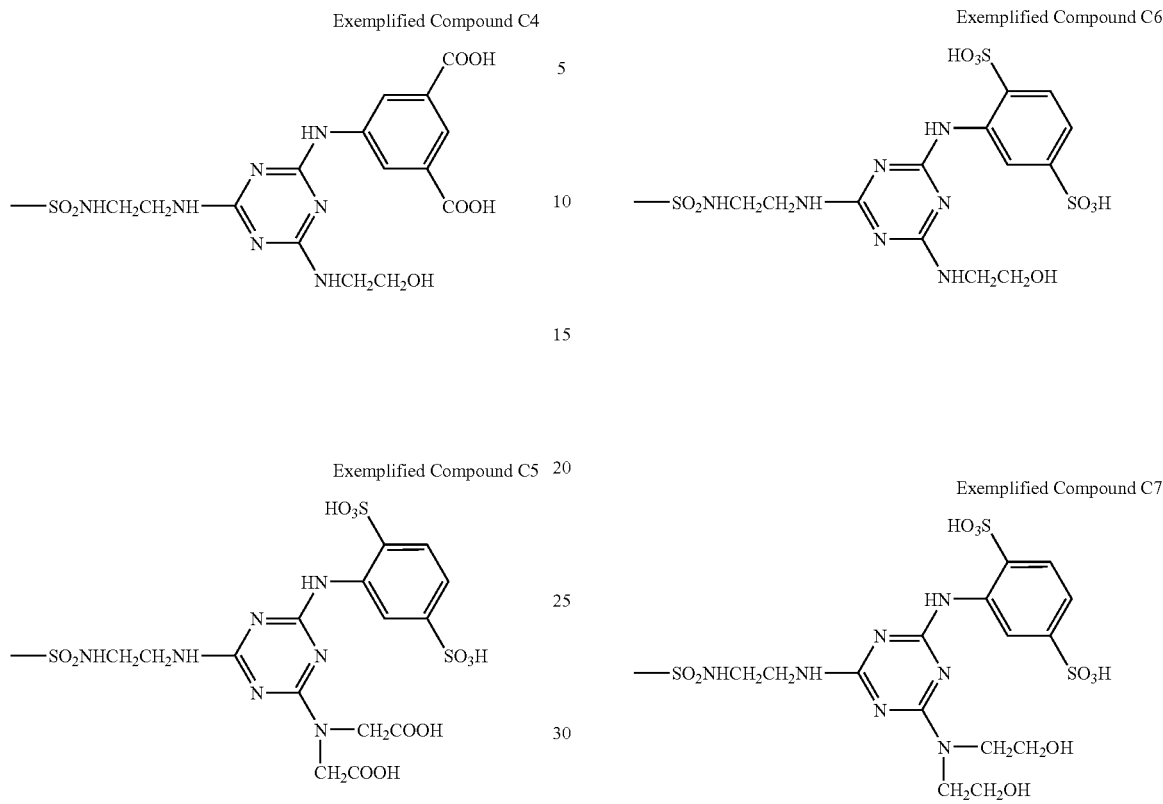

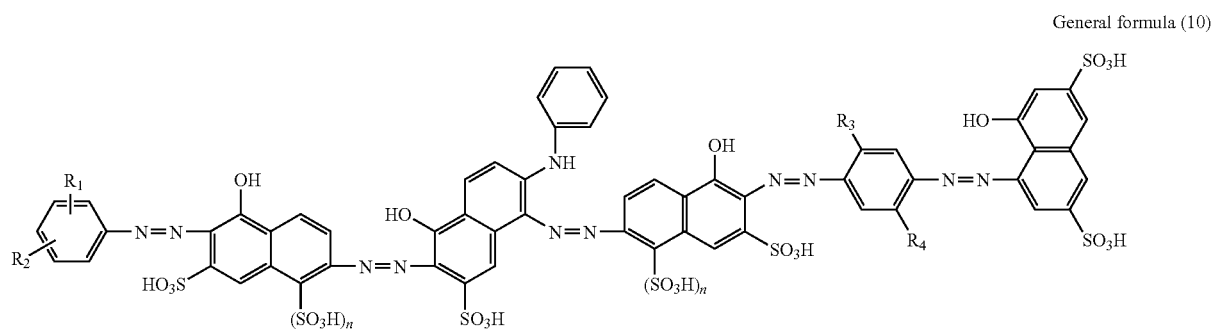

where $R_1$ and $R_2$ each independently represent a hydrogen atom, a hydroxyl group, an amino group, a carboxyl group, a sulfonic group, an alkyl group having 1 to 4 carbon atoms, or an alkoxy group having 1 to 4 carbon atoms, $R_3$ and $R_4$ each independently represent a hydrogen atom, an alkyl group having 1 to 4 carbon atoms, an alkoxy group having 1 to 4 carbon atoms, a hydroxyl group, an alkyl group which has 1 to 4 carbon atoms and which may be substituted by a hydroxyl group or an alkoxy group having 1 to 4 carbon atoms, an alkoxy group which has 1 to 4 carbon atoms and which may be substituted by a hydroxyl group, an alkoxy group having 1 to 4 carbon atoms, a sulfonic group, or a carboxyl group, or an amino group substituted by an alkyl group or an acyl group, and n represents 0 or 1;

General formula (11)

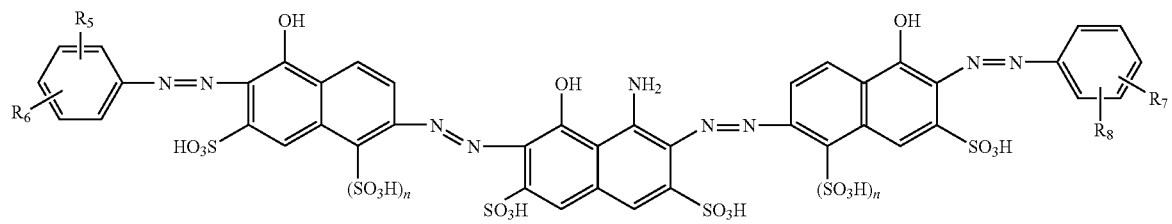

where $R_5$, $R_6$, $R_7$, and $R_8$ each independently represent a hydrogen atom, a hydroxyl group, an amino group, a carboxyl group, a sulfonic group, an alkyl group having 1 to 4 carbon atoms, an alkoxy group having 1 to 4 carbon atoms, an alkoxy group substituted by a hydroxyl group, an alkoxy group having 1 to 4 carbon atoms, a sulfonic group, or a carboxyl group, an alkoxy group which has 1 to 4 carbon atoms and which may be additionally substituted by a carboxyl group or a sulfonic group, or an amino group substituted by a phenyl group, an alkyl group, or an acyl group, and n represents 0 or 1.

Exemplified Compounds Bk1 to Bk3 are shown below in free acid forms as preferable specific examples of the colorant represented by the formula (10), and Exemplified Compounds Bk4 to Bk6 are shown below in free acid forms as preferable specific examples of the colorant represented by the formula (11). However, the colorant to be used in the present invention is not limited to these compounds. In addition, two or more kinds of such colorants as shown below may be simultaneously used. It is particularly preferable to use Exemplified Compound Bk3 and Exemplified Compound Bk4 among the above-mentioned compounds simultaneously.

Exemplified Compound Bk1

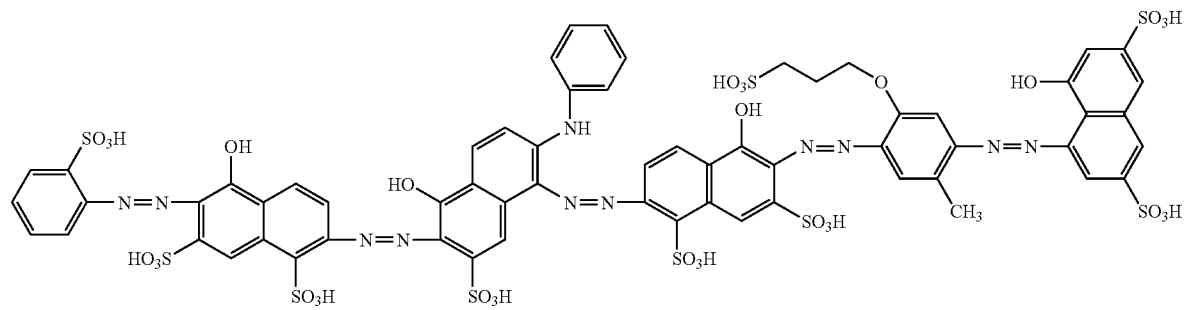

Exemplified Compound Bk2

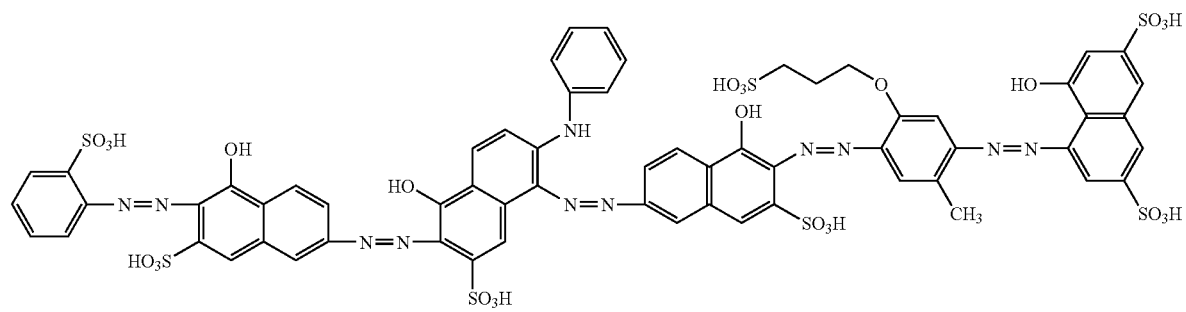

Exemplified Compound Bk3

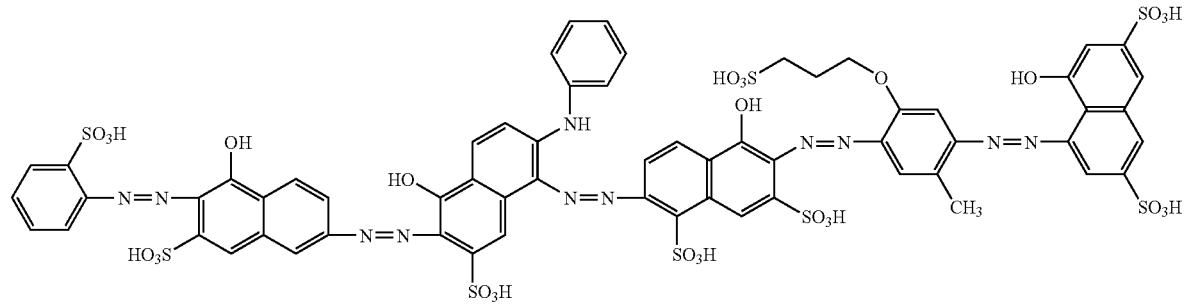

Exemplified Compound Bk4

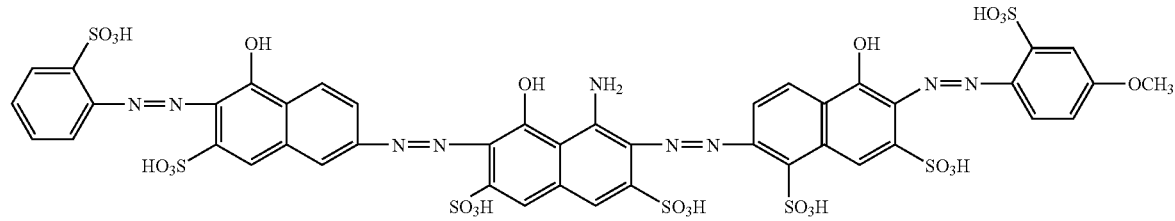

Exemplified Compound Bk5

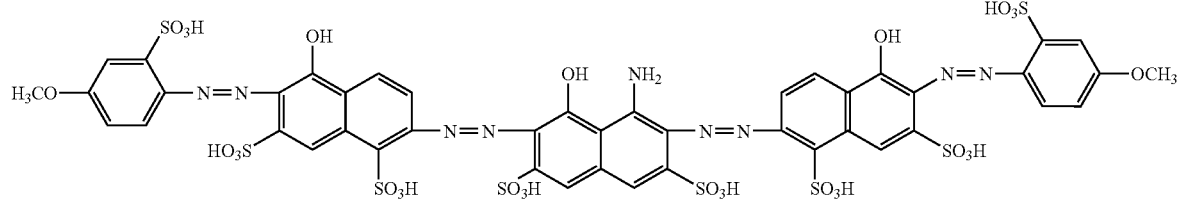

Exemplified Compound Bk6

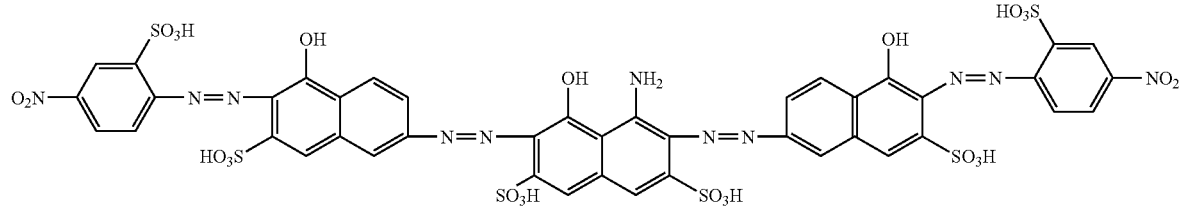

<Water-soluble organic solvent and additive>

The ink according to the present invention is obtained by dissolving or dispersing a substance that dissolves the protective layer, compounds represented by the general formula (1), and any one of the above-mentioned colorants in an aqueous medium. A mixed medium of water and a water-soluble organic solvent is preferably used as the aqueous medium. At this time, there is no particular limitation on what water-soluble organic solvent is incorporated. Any one of various water-soluble organic solvents can be arbitrarily used. The water-soluble organic solvents are not particularly limited as long as they are water-soluble, and examples thereof include an alcohol, a polyhydric alcohol, a polyglycol, a glycol ether, a nitrogen-containing polar solvent, and a sulfur-containing polar solvent. Examples of a water-soluble organic solvent that can be used for the ink of the present invention are shown below, but the present invention is not limited to these water-soluble organic solvents.

Specific examples of the water-soluble organic solvents include: alkyl alcohols each having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols in each of which an alkylene group has 2 to 6 carbon atoms such as ethylene glycol, propylene glycol, butylene glycol, triethylene glycol, 1,2,6-hexane triol, thio diglycol, hexylene glycol, and diethylene glycol; lower alkyl ether acetates such as polyethylene glycol monomethyl ether acetate; lower alkyl ethers of polyhydric alcohols such as ethylene glycol monomethyl (or ethyl) ether, diethylene glycol methyl (or ethyl) ether, and triethylene glycol monomethyl (or ethyl) ether; polyhydric alcohols such as trimethylolpropane and trimethylolethane; glycerin; N-methyl-2-pyrrolidone; 2-pyrrolidone; and 1,3-dimethyl-2-imidazolidinone. Each of the water-soluble organic solvents as described above may be used alone, or two or more of them may be used as a mixture.

In addition, the ink may optionally contain various additives such as a surfactant, a pH adjustor, a rust inhibitor, an antiseptic, a mildewproofing agent, an antioxidant, an antireducing agent, an evaporation accelerator, a chelating agent, and a water-soluble polymer.

(Ink Set)

An ink set of the present invention is preferably a combination of plural inks in one ink tank. How to combine ink colors is not particularly limited; inks having the same color may be combined, or inks different from each other in hue may be combined. Specific examples of the ink set include: an ink set composed of three basic colors, that is, cyan, magenta, and yellow colors; an ink set composed of a black ink, and a thin cyan ink and a thin magenta ink (so-called pale cyan ink and pale magenta ink) and suitable for outputting a photographic image; an ink set composed of spot colors, that is, red, green, and blue colors; and an ink set composed of a black ink, and a thin black ink and an additionally thin black ink (so-called gray ink and light gray ink). However, the present invention is not particularly limited to those ink sets.

The inventors of the present invention have made extensive studies on the above-mentioned problem. As a result, the inventors have found that setting the concentration of a compound that forms a chelating compound with silicon in each of plural inks to fall within a specific range suppresses the dissolution of a silicon nitride, silicon oxide, or silicon carbide of which the protective layer of the heat generating portion of a head is formed, secures good ejection property even after long-term storage, and enables an image to be stably formed. In particular, in the case where the rate at which the protective layer is dissolved largely varies depending on the kinds of inks to be combined in one ink tank, the resistance of the heat generating portion of a nozzle from which each ink is ejected fluctuates, so it becomes difficult to control an electrical pulse signal to be applied to the heat generating portion. In addition, even in the case where an electrical pulse signal is controlled in order to cope with a fluctuation in resistance due to the dissolution of the protective layer, there arises a need for controlling an electrical pulse signal for each color. The need is not preferable because the driving of an electrical pulse becomes complicated, and the complicated driving is responsible for an increase in cost of the head or a printer main body. On the other hand, even in the case where no pulse control in accordance with the rate at which the protective layer is dissolved is performed, foaming energy to be applied to any one of the inks is different from foaming energy to be applied to any one of the other inks, so the amount of an ink droplet to be ejected and the rate at which the ink droplet is ejected which are set at an initial stage vary.

As a result, the deviation of: the amount of each ink droplet to be applied to a recording medium; or the position at which each ink droplet impinges on the recording medium is apt to be remarkable as compared to the case of only one kind of ink, thereby leading to a problem in that image deterioration is apt to occur.

Therefore, in the present invention, the rate at which a protective layer in contact with each of inks is dissolved is preferably controlled to fall within a certain range. To be specific, it is preferable that: each of the inks contain a substance that dissolves the protective layer and a compound represented by the general formula (1); and the content X (% by mass) of the compound represented by the general formula (1) in the ink satisfy the relationship of $1 \leq X \leq 30$. Further, it is more preferable that: each of the inks contain a polycarboxylic acid or a salt thereof; and the content Y (mmol/l) of the polycarboxylic acid and the salt thereof in the ink satisfy the relationship of $0.001 \leq Y \leq 0.02X+0.09$. The largest difference between the content of the compound represented by the general formula (1) to be incorporated into any one of the inks and the content of the compound represented by the general formula (1) to be incorporated into any one of the other inks is particularly preferably 8% by mass or less.

(Ink Cartridge)

Next, an embodiment of the present invention will be described with reference to the drawings. It should be noted that the attached drawings which are incorporated herein and form part hereof show several aspects of the present invention, and are subjected to use for explaining the rule and principle of the present invention in combination with the description. FIGS. 1, 2, 3, 4A, 4B, 5 and 6 are each an explanatory view for explaining a suitable recording head in or to which the present invention is practiced or applied. Hereinafter, each component will be described with reference to those drawings.

Figure 2:
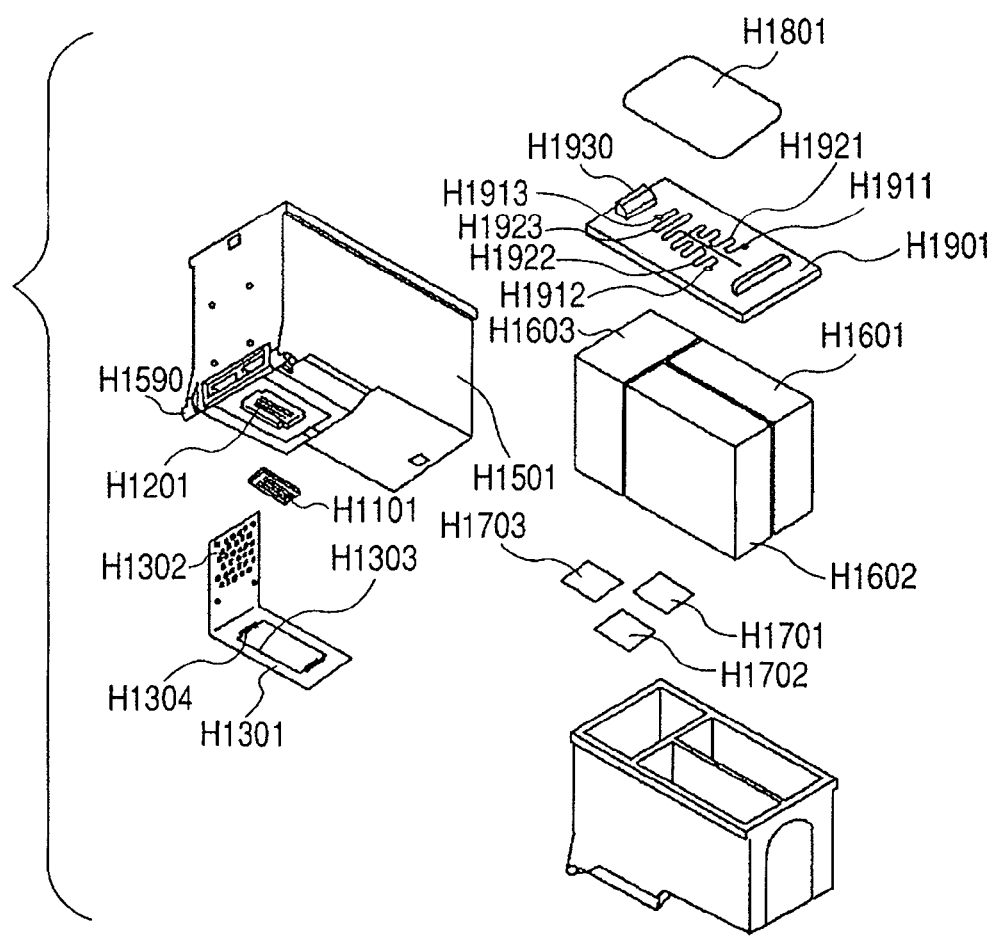
FIG. 2 is an exploded view of the recording head (i.e., ink cartridge).

As shown in each of FIGS. 1 and 2, a recording head (i.e., ink cartridge) of the present invention is constituted in such a manner that the head and an ink tank are integrated with each other. A recording head (i.e., ink cartridge) H1001 in each of FIGS. 1 and 2 is mounted with three color inks: a cyan ink, a magenta ink, and a yellow ink. The recording head H1001 is fixed and supported by means for positioning a carriage mounted on the main body of an ink-jet recording apparatus and by an electrical contact, and is detachable from the carriage. Each of the inks with which the head is mounted is exchanged after having been consumed.

Next, the respective components of which the recording head (i.e., ink cartridge) is constituted will be sequentially described in more detail.

(Recording Head (i.e., Ink Cartridge))

The recording head (i.e., ink cartridge) H1001 in this example is a recording head according to a bubble jet (registered trademark) mode using an electrothermal transducer that generates thermal energy for causing the film boiling of ink in accordance with an electrical signal. The recording head is a so-called side-shooter type recording head in which an electrothermal transducer and an ink ejection opening are arranged so as to be opposite to each other. In the present invention, the head preferably has a nozzle train in which 150 or more nozzles are arranged at a pitch interval of 300 dpi or more and the amount of ink to be ejected from each nozzle is 30 pl or less from the viewpoints of the outputting of a high-quality image to plain paper and high-speed printing. Further, from the viewpoint of compatibility between photograph picture quality and high-speed printing, the head preferably has a nozzle train in which 100 or more nozzles from each of which ink is ejected in an amount of 6 pl or less are arranged at a pitch interval of 600 dpi or more.

(1-1) Recording Head (i.e., Ink Cartridge)

The recording head (i.e., ink cartridge) H1001 is used for ejecting the three color inks, that is, the cyan, magenta, and yellow inks. As shown in the exploded perspective view of FIG. 2, the head includes a recording element substrate H1101, an electric wiring tape H1301, and an ink supplying/holding member H1501. The head further includes filters H1701, H1702, and H1703, ink absorption members H1601, H1602, and H1603, a lid member H1901, and a sealing member H1801.

(1-1-1) Recording Element Substrate

Figure 3:
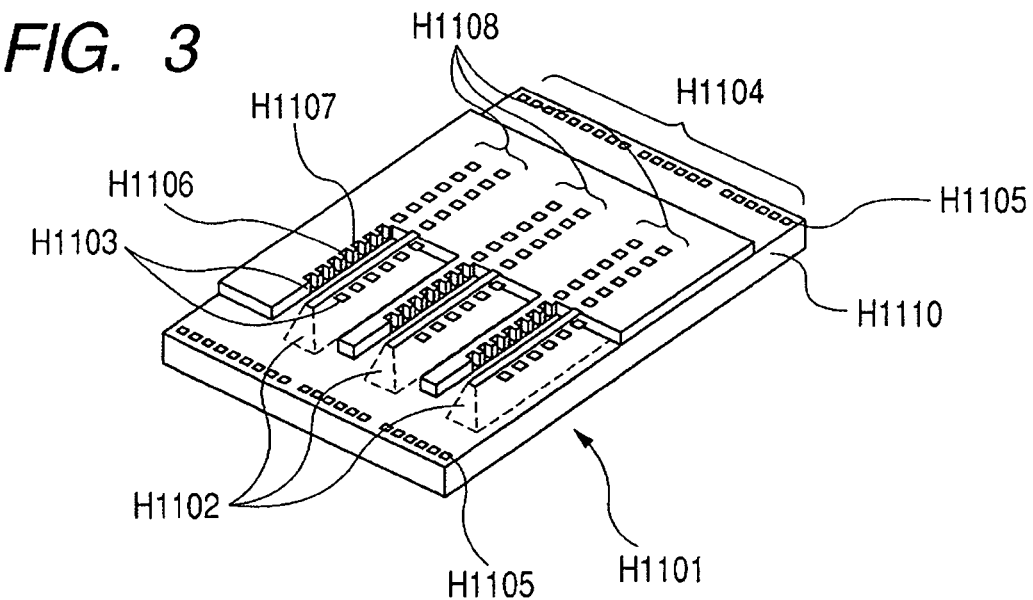
FIG. 3 is a partially cut perspective view of a recording element substrate.

FIG. 3 is a partially cut perspective view for explaining the constitution of the recording element substrate H1101. Three ink supply openings H1102 for three inks, that is, cyan, magenta, and yellow inks are formed in parallel with one another. Electrothermal transducers H1103 placed in a line and ejection openings H1107 placed in a line are arranged and formed in a zigzag fashion on both sides of each of the ink supply openings H1102 so that the ink supply opening are sandwiched between the line of the electrothermal transducers and the line of the ejection openings. In addition, electric wiring, a fuse, electrode portions H1104 and the like are formed on a silicon substrate H1110. Ink flow path walls H1106 and the ejection openings H1107 are each formed of a resin material on the resultant by means of a photolithography technique. Bumps H1105 each made of Au or the like are formed in the electrode portions H1104 for supplying power to the electric wiring.

(1-1-2) Nozzle Structure

Figure 4A:
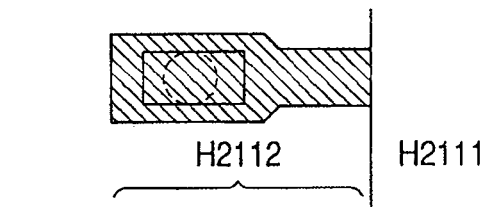
FIGS. 4A and 4B are views each schematically showing the nozzle structure of a thermal ink-jet head.
Figure 4B:
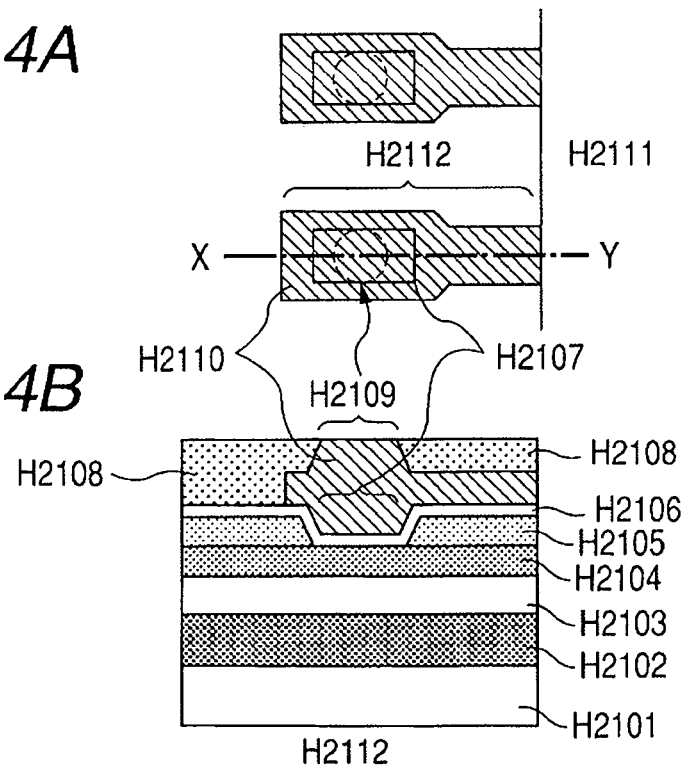
Figure 5:
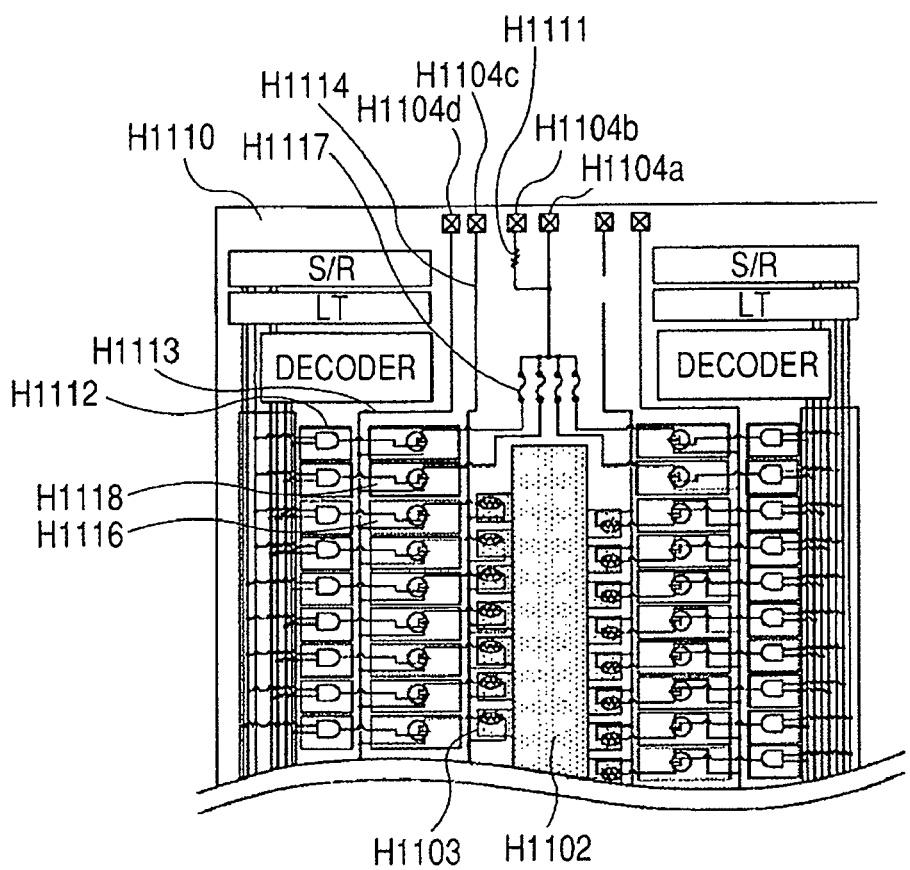
FIG. 5 is a view schematically showing an Si substrate.
Figure 6:
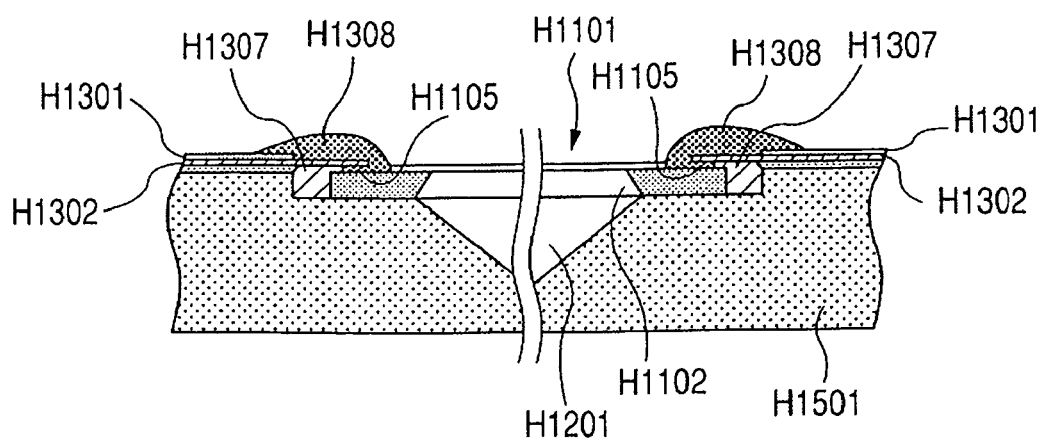
FIG. 6 is a sectional view of part of the recording head (i.e., ink cartridge).

FIGS. 4A and 4B are each a view schematically showing a nozzle part provided for an ink-jet head to which the ink according to the present invention is applied. FIG. 4A is a view showing the shape of a nozzle when the nozzle is seen from its ejection opening side. FIG. 4B is a view showing a cross section taken along the broken line X-Y of FIG. 4A. In FIG. 4B, reference symbol H2101 represents a silicon substrate and reference symbol H2102 represents a heat accumulation layer composed of a thermal oxidation layer. In addition, reference symbol H2103 represents an interlayer layer which also serves to accumulate heat and is composed of, for example, a silicon oxide layer or a silicon nitride layer, reference symbol H2104 represents a heating resistor layer, and reference symbol H2105 represents a metal wiring layer as wiring composed of a metal material such as Al, Al—Si, or Al—Cu. In addition, reference symbol H2106 represents a protective layer which is composed of, for example, a silicon oxide layer, a silicon nitride layer, or a silicon carbide layer and functions as an insulating layer as well. Of those, the protective layer H2106 directly contacts with the ink, so the layer is requested to be chemically stable against, for example, an alkali, and to have sufficient resistance against a physical shock, and the necessity for the layer to be provided with electrical insulating property is great. Accordingly, a silicon nitride layer or a silicon carbide layer can be particularly suitably used as a material of which the layer is formed. In addition, reference symbol H2107 represents a heat generating portion, and heat generated in the heat element of the heating resistor layer H2104 acts on the ink.

The heat generating portion H2107 in the ink-jet head is a part which: is exposed to high temperature owing to the generation of heat in the heat element; and mainly receives a cavitation impact or a chemical action by the ink in association with the foaming of the ink and the contraction of foam after the foaming. Accordingly, the heat generating portion H2107 is provided with the protective layer H2106 for protecting an electrothermal transducer from the cavitation impact and the chemical action by the ink. The thickness of the protective layer H2106 is preferably in the range of from 50 nm to 500 nm from the viewpoints of: thermal conversion efficiency that is important in the efficient conversion of an electrical pulse to be applied to the heat element; and the protection from a physical shock and chemical corrosion caused by the ink in association with a foaming phenomenon.

That is, when the thickness is less than 50 nm, the ejection durability of the heat generating portion may be insufficient, or a fluctuation in energy to be inputted may be sensitively susceptible to a change in thickness due to the dissolution of the protective layer due to storage. On the other hand, when the thickness exceeds 500 nm, foaming requires large energy, and, in the case where nozzles are arranged at a high density and the frequency at which ink is ejected is increased, the temperature of a nozzle tends to be likely to increase. Further, in the present invention, the thickness of the protective layer is particularly preferably in the range of from 100 nm or more to 450 nm or less in order that the number of nozzles may additionally increase, the density at which the nozzles are arranged may additionally increase, and the ejection durability of the heat generating portion may additionally improve. An ejection element provided with an ejection opening H2109 for ejecting ink is formed by using a flow path forming member H2108 on the protective layer H2106.

A diagonal line portion H2110 of each of FIGS. 4A and 4B is a liquid chamber part of a nozzle portion to be filled with ink. The ink is supplied from a common liquid chamber H2111 arranged on the right side of the nozzle portion. After having foamed in the heat generating portion H2107 to form foam, the ink is extruded from the ejection opening H2109, and is ejected in the form of an ink droplet.

In addition, the relationship between the volume of the liquid chamber of the nozzle represented by reference symbol H2110 and the area of the protective layer H2106 with which the ink contacts is important in the present invention. In general, the ejection opening H2109 is capped with a sealing means such as a sealing tape or a hot-melt adhesive in order that the drying of the ink may be suppressed when an ink cartridge in which an ink-jet head and an ink tank are integrated with each other is stored for a long period of time in a case of, for example, physical distribution. Accordingly, the ink of the liquid chamber H2110 of the nozzle is brought into a state where the ink resides in the liquid chamber of the nozzle for a long period of time. As a result, a state where the ink inside the liquid chamber and the protective layer H2106 contact with each other continues, so the protective layer is considered to dissolve in the ink gradually.

Investigation conducted by the inventors of the present invention has revealed the following: while the ink cartridge is stored in such the state, the ink present in the ink liquid chamber H2110 is seldom fluidized, the dissolution of the protective layer reaches equilibrium when the concentration of dissolved silicon saturates, and the dissolution hardly progresses thereafter. In view of the foregoing, the inventors have found that the dissolution of the protective layer H2106 can be suppressed to some degree by controlling a ratio of the volume of the liquid chamber H2110 of the nozzle to the surface area of the protective layer H2106 as the outermost surface with which the ink in the liquid chamber H2110 of the nozzle contacts to fall within a certain range. To be specific, a ratio of the volume of the ink liquid chamber H2110 of each nozzle to the surface area of a part of the protective layer H2106 of each nozzle part with which ink contacts is preferably adapted to be 50 $\mu m^3/\mu m^2$ or less, so the dissolution of the protective layer is suppressed when a state where the protective layer contacts with the ink for a long period of time in, for example, physical distribution storage continues.

In addition, the structure of a nozzle is limited when an attempt is made to drive the head at a high frequency of 10 kHz or more, so the ratio is more preferably in the range of from 5 $\mu m^3/\mu m^2$ or more to 40 $\mu m^3/\mu m^2$ or less from the viewpoint of ejection property. It should be noted that the volume of the ink liquid chamber of each nozzle (volume of a nozzle liquid chamber) defined herein refers to a part corresponding to reference symbol H2110 of each of FIGS. 4A and 4B, and is the volume of an ink flow path part branching from the common liquid chamber H2111 and reaching the ejection opening H2109. In addition, the term "the surface area of a part of the protective layer of each nozzle part in contact with ink" as used herein corresponds to the surface area of a part of the protective layer H2106 as the outermost surface of a nozzle part with which the ink contacts, more specifically, the surface area of the protective layer in contact with the ink in the liquid chamber H2110.

In addition, in the case of the so-called side-shooter type recording head as shown in the figures in which an electrothermal transducer and an ink ejection opening are arranged so as to be opposite to each other, respective nozzles are arranged on both ends of a common liquid chamber so as to be opposite to each other, so an ink flow path does not have a straight structure but has a bent structure. The bent structure is preferable because the convection of ink hardly occurs between each nozzle and the common ink liquid chamber in long-term storage, the dissolution of a silicon compound as a component of which a protective layer is formed easily saturates in a nozzle, and a reduction in thickness of the protective layer is suppressed.

(1-1-3) Electric Wiring Tape

The electric wiring tape H1301 forms an electrical signal path for applying, to the recording element substrate H1101, an electrical signal for ejecting ink, and an opening into which the recording element substrate is to be incorporated is formed in the tape. Electrode terminals H1304 to be connected to the electrode portions H1104 of the recording element substrate are formed near the edges of the opening. In addition, external signal input terminals H1302 for receiving electrical signals from the main body of the apparatus are formed in the electric wiring tape H1301. The electrode terminals H1304 and the external signal input terminals H1302 are connected by a continuous copper foil wiring pattern.

The electric wiring tape H1301 and the second recording element substrate H1101 are electrically connected by electrically joining the bumps H1105 and the electrode terminals H1304 by a thermal ultrasonic contact bonding method. The bumps H1105 are formed in the electrode portions H1104 of the second recording element substrate H1101, and the electrode terminals H1304 are formed in the electric wiring tape H1301 corresponding to the electrode portions H1104 of the second recording element substrate H1101.

(1-1-4) Ink Supplying/Holding Member

The ink supplying/holding member H1501 is formed by molding a resin, and a thermoplastic resin material that can be molded by, for example, injection molding, compression molding, or heat forming can be suitably used as a component of the member. Preferable examples of an appropriate thermoplastic resin include, but not limited to, polyester, polycarbonate, polypropylene, polyethylene, polystyrene, and polyphenylene ether, and mixtures and modified products of them. Of those, polyphenylene ether is preferable, and an alloy of polyphenylene ether and a styrene-based material is particularly preferable. A thermoplastic resin material mixed with 5 to 40 mass % of a filler is preferably used as a resin material from the viewpoints of an improvement in rigidity of shape and the suppression of permeability to gases. Examples of a preferable filler include, but not limited to, inorganic substances such as glass, silica, and graphite (i.e., black lead). High levels of ink resistance and welding property are required, and, in the case where a recording head is directly implemented on the ink supplying/holding member like this embodiment, high levels of, for example, adhesiveness with an adhesive and linear expansibility due to heat are also required. A resin material obtained by mixing an alloy of polyphenylene ether and a styrene-based material with a filler is particularly preferable from the viewpoint of a balance among those required properties.

As shown in FIG. 2, the ink supplying/holding member H1501 has spaces each intended to hold independently any one of the absorption members H1601, H1602, and H1603 for generating negative pressures for holding the cyan, magenta, and yellow inks in them. The ink supplying/holding member H1501 is further provided with an ink supplying function of forming independent ink flow paths for guiding inks to the respective ink supply openings H1102 of the recording element substrate H1101. Each of the ink absorption members H1601, H1602, and H1603, which is preferably obtained by compressing a polypropylene (PP) fiber, may be obtained by compressing a urethane fiber. Boundary portions of the upstream portions of the respective ink flow paths with the ink absorption members H1601, H1602, and H1603 are joined by welding to the filters H1701, H1702, and H1703 for preventing the penetration of dust into the recording element substrate H1101, respectively. Each of the filters H1701, H1702, and H1703, which may be of an SUS metal mesh type, is preferably of an SUS metal fiber sintered type.

Ink supply openings H1201 for supplying the respective inks, that is, the cyan, magenta, and yellow inks to the recording element substrate H1101 are formed in the downstream portions of the ink flow paths. The recording element substrate H1101 is bonded and fixed to the ink supplying/holding member H1501 with high accuracy of position in such a manner that each of the ink supply openings H1102 of the recording element substrate H1101 is in communication with each of the ink supply openings H1201 of the ink supplying/holding member H1501. A first adhesive to be used in the bonding is preferably one which: has a low viscosity and a low curing temperature; cures in a short period of time; has relatively high hardness after curing; and has ink resistance. For example, a thermosetting adhesive mainly composed of an epoxy resin is used as the first adhesive, and the thickness of an adhesive layer at that time is preferably about 50 μm.

Part of the rear surface of the electric wiring tape H1301 is bonded and fixed to a flat surface around the ink supply openings H1201 by using a second adhesive. The part where the second recording element substrate H1101 and the electric wiring tape H1301 are electrically connected to each other is sealed with a first sealing compound H1307 and a second sealing compound H1308 (see FIG. 6) so that the part where they are electrically connected to each other is protected from corrosion by ink and an external impact. The first sealing compound H1307 seals mainly the rear surface side of the portion where any one of the external signal input terminals H1302 of the electric wiring tape H1301 and any one of the bumps H1105 of the recording element substrate are connected and the outer peripheral part of the recording element substrate. The second sealing compound H1308 seals the front surface side of the above-mentioned portion where any one of the external signal input terminals H1302 and any one of the bumps H1105 are connected. In addition, an unbonded portion of the electric wiring tape H1301 is bent, and is fixed to a side surface substantially perpendicular to the surface of the ink supplying/holding member H1501 having the ink supply openings H1201 by, for example, heat caulking or bonding.

(1-1-5) Lid Member

The lid member H1901 is welded to the upper opening of the ink supplying/holding member H1501, whereby the member closes the independent spaces inside the ink supplying/holding member H1501. It should be noted that the lid member H1901 has fine openings H1911, H1912, and H1913 for letting pressure fluctuations of the respective chambers inside the ink supplying/holding member H1501 escape, and fine grooves H1921, H1922, and H1923 in communication with the respective openings. Other ends of the fine grooves H1921 and H1922 merge with some midpoint in the fine groove H1923. Further, the sealing member H1801 covers the fine openings H1911, H1912, and H1913, the fine grooves H1921 and H1922, and most part of the fine groove H1923, and the other end portion of the fine groove H1923 is opened, whereby an air vent is formed. The formation of such air vent with a labyrinth structure is preferable because the formation can effectively suppress the evaporation of an ink volatile component from the air vent. In addition, the lid member H1901 has an engaging portion H1930 for fixing the recording head to an ink-jet recording apparatus.

A resin material mixed with a filler similar to that of the ink supplying/holding member can be suitably used in the lid member. Even when the above-mentioned resin material is used in each of the ink supplying/holding member and the lid member, the permeation of moisture from the resin material itself cannot be avoided. Accordingly, some degree of ink evaporation occurs even when the above-mentioned air vent with a labyrinth structure is provided.

(1-2) Mounting of Recording Head (i.e., Ink Cartridge) on Ink-Jet Recording Apparatus As shown in FIG. 1, the recording head H1001 includes: a mounting guide H1560 for guiding the head to the position at which the head is mounted on the carriage of the main body of the ink-jet recording apparatus; and the engaging portion H1930 for mounting and fixing the head on and to the carriage by using a head set lever. The head further includes an abutting portion H1570 in an X direction (i.e., carriage scan direction), an abutting portion H1580 in a Y direction (i.e., recording medium conveying direction), and an abutting portion H1590 in a Z direction (i.e., ink ejection direction), for positioning the head at the predetermined position at which the head is mounted on the carriage. The head is positioned by the above-mentioned abutting portions, whereby the external signal input terminals H1302 on the electric wiring tapes H1300 and H1301 electrically contact with contact pins as electrical connection portions provided for the inside of the carriage in an accurate manner.

(1-3) Method of Driving Recording Head

When a pulse-like electrical signal is applied to the metal wiring layer H2105 of the head shown in FIGS. 4A and 4B, the heat generating portion H2107 of the heating resistor layer H2104 abruptly generates heat, and foam is generated in ink in contact with the surface of the heat generating portion. The pressure of the foam causes a meniscus to protrude. Then, the ink is ejected through the ejection opening H2109 of the head to become a small ink droplet, and the droplet flies to a recording medium.

Next, a γ value will be described. The γ value is a factor representing a ratio of energy to be actually inputted to critical energy with which a bubble jet head can manage to eject ink. That is, energy E to be inputted is represented by the following equation (A) where P represents the width of a pulse to be applied to the bubble jet head (when plural pulses are applied dividedly, the total width of the pulses), V represents a voltage to be applied, and R represents the resistance of a heater.

$$E = P \times V^2 / R \quad (A)$$

At this time, the γ value is given by the following equation (B) where Eth represents the minimum energy needed for the heater with which the bubble jet head can manage to eject ink and Eop represents energy to be inputted when the head is actually driven.

$$\gamma = Eop/Eth \quad (B)$$

In addition, a practical method of determining the γ value from the conditions under which the bubble jet head is driven is the following method.

First, an appropriate pulse width with which the bubble jet head ejects ink at a given voltage is found before the head is driven. Next, the pulse width is gradually shortened, and the pulse width with which the head stops ejecting ink is found. The minimum pulse width with which the head can eject ink immediately before the foregoing pulse width is represented by Pth. The γ value is determined from the following equation (C) where Pop represents a pulse width to be actually used upon driving of the head.

$$\gamma = Pop/Pth \quad (C)$$

In order that ink may be stably ejected, the head is preferably driven under such a condition that the γ value defined as described above is in the range of from 1.10 to 1.50. Such driving condition additionally prevents a kogation from adhering to the heater, and hence can additionally lengthen the lifetime of the recording head. In addition, a heat generating portion can be examined for change in heating resistance before and after long-term storage by: measuring the minimum pulse width Pth0 immediately after the production of an ink tank and the minimum pulse width Pth1 after the long-term storage; and determining a rate of change between them in accordance with the following equation (D).

$$\alpha(\%) = 100 \times (Pth1 - Pth0)/Pth0 \quad (D)$$

The rate a of change in α is preferably less than 30% in order that ink may be stably ejected, in particular, various ejection properties such as: a fluctuation in amount of the ink to be ejected concerning the stability of a foaming state; refill property with which the ink is supplied to a nozzle; heat accumulation property due to continuous ejection concerning a fluctuation in energy to be applied to a heat generating portion; and ejection durability may be satisfied. In particular, when even a photographic image is intended to be outputted, α is preferably less than 20% because there arises a need for controlling the stable ejection of the ink with improved accuracy in order that the preferable range of the amount of the ink to be ejected from one nozzle may be 6 pl or less.

(Ink-Jet Recording Apparatus)

Figure 7:
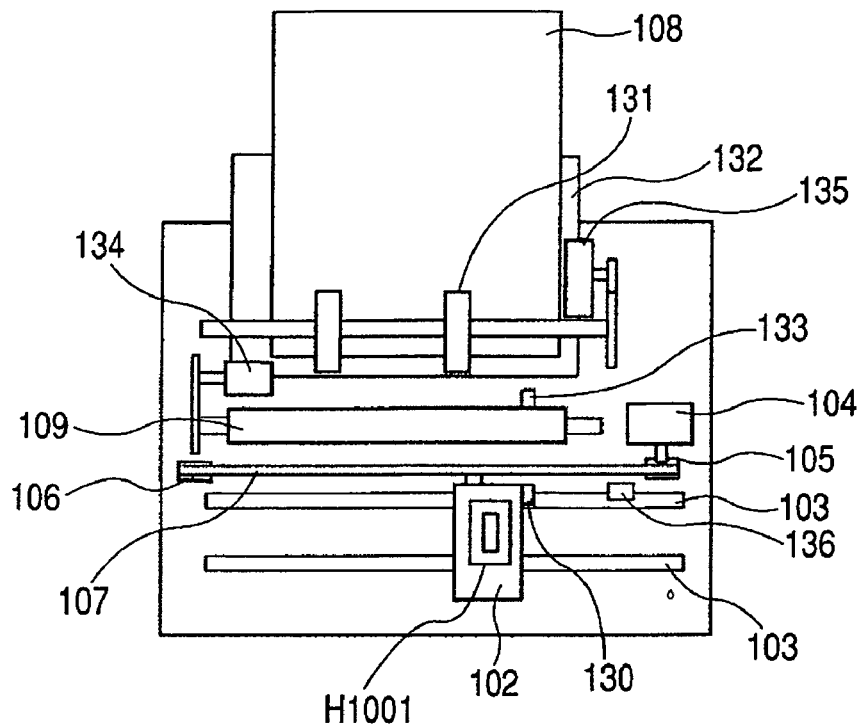
FIG. 7 is a view showing an ink-jet recording apparatus.

Next, a liquid ejection recording apparatus on which such recording head of a cartridge type as described above can be mounted will be described. FIG. 7 is an explanatory view showing an example of a recording apparatus on which the liquid ejection recording head of the present invention can be mounted. In the recording apparatus shown in FIG. 7, the recording head H1001 shown in FIG. 1 is positioned with respect to and mounted on a carriage 102 so as to be detachable from the carriage, and the carriage 102 is provided with electrical connection portions for transferring a drive signal and the like to the respective ejection portions through the external signal input terminals on the recording head H1001.

The carriage 102 is reciprocatably guided and supported along a guide shaft 103 installed in the apparatus main body to extend in a main scanning direction. In addition, the carriage 102 is driven by a main scan motor 104 via driving mechanisms such as a motor pulley 105, a driven pulley 106, and a timing belt 107, and, at the same time, its position and movement are controlled. In addition, the carriage 102 is provided with a home position sensor 130. With this constitution, the position of the carriage can be known when the home position sensor 130 on the carriage 102 passes the position of a shielding plate 136.

Recording media 108 such as printing paper and a plastic thin plate are separately fed one by one from an automatic sheet feeder (ASF) 132 by rotating a pickup roller 131 from a sheet feeding motor 135 via a gear. Further, each of the media is conveyed (i.e., sub-scanned) through a position (i.e., print portion) opposite to the ejection opening surfaces of the recording heads H1000 and H1001 by the rotation of a transport roller 109. The transport roller 109 is rotated by the rotation of an LF motor 134 via a gear. At that time, judgment as to whether a medium was fed and the determination of a heading position upon sheet feeding are performed when each of the recording media 108 passes a paper end sensor 133. Further, the paper end sensor 133 is used to find the position where the rear end of each of the recording media 108 is actually placed and to identify a current recording position from the actual rear end finally as well.

It should be noted that the rear surface of each of the recording media 108 is supported by a platen (not shown) in order that a flat print surface may be formed in the print portion. In this case, the recording head H1001 mounted on the carriage 102 is held in such a manner that its ejection opening surface protrudes downward from the carriage 102 and is in parallel with each of the recording media 108 between the two pairs of transport rollers. The recording head H1001 is mounted on the carriage 102 in such a manner that the directions in each of which ejection openings are arranged in each ejection portion (i.e., ejection opening trains) intersect the above-mentioned scanning direction of the carriage 102, and recording is performed by ejecting a liquid from these ejection opening trains.

EXAMPLES

Hereinafter, the present invention will be described more specifically by way of examples and comparative examples. However, the present invention is not limited by the following examples as long as the present invention does not depart from its gist. It should be noted that the terms "part(s)" and "%" in the following description represent "part(s) by mass" and "mass %", respectively, unless otherwise stated.

<Production of Colorant>

(Cyan Dye 1)

Sulfolane, a 4-sulfophthalic acid monosodium salt, ammonium chloride, urea, ammonium molybdate, and cupric chloride were stirred and washed with methanol. After that, water was added to the mixture, and the pH of the resultant liquid was adjusted to 11 by using an aqueous solution of sodium hydroxide. Next, an aqueous solution of hydrochloric acid was added to the liquid while the liquid was stirred, and then sodium chloride was gradually added to the mixture. Then, a precipitated crystal was filtered and washed with a 20% aqueous solution of sodium chloride. Subsequently, methanol was added, and the precipitated crystal was separated by filtration. Further, the crystal was washed with a 70% aqueous solution of methanol, and was then dried, whereby a copper phthalocyanine tetrasulfonic acid tetrasodium salt as a blue crystal was obtained.

Next, the copper phthalocyanine tetrasulfonic acid tetrasodium salt obtained in the foregoing was gradually added to chlorosulfonic acid, and thionyl chloride was dropped to the mixture. A reaction liquid was cooled and a precipitated crystal was filtered, whereby a desired wet cake of copper phthalocyanine tetrasulfonic acid chloride was obtained. The wet cake was stirred and suspended, and ammonia water and a compound of the following formula (α) were added to the cake. Further, water and sodium chloride were added to the resultant, whereby a crystal was precipitated. The precipitated crystal was filtered and washed with an aqueous solution of sodium chloride. The crystal was filtered and washed again, and was then dried, whereby a colorant to be used in examples, that is, Cyan Dye 1 was obtained.

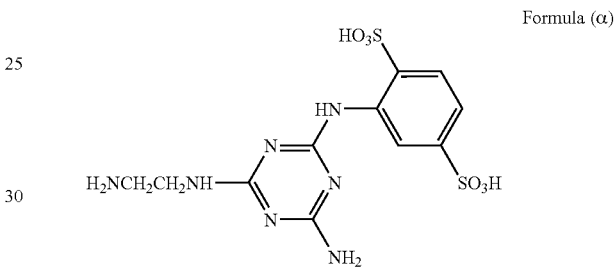

Formula (α)

The compound represented by the formula (α) was synthesized as described below. Lipal OH, cyanuric chloride, and an aniline-2,5-disulfonic acid monosodium salt were loaded into ice water, and then an aqueous solution of sodium hydroxide was added. Next, a reaction liquid was added with an aqueous solution of sodium hydroxide, and its pH was adjusted to 10.0. 28% ammonia water and ethylenediamine were added to the reaction liquid. Subsequently, sodium chloride and concentrated hydrochloric acid were dropped to the resultant, whereby a crystal was precipitated. The precipitated crystal was filtered and fractionated, and was washed with a 20% aqueous solution of sodium chloride, whereby a wet cake was obtained. Methanol and water were added to the resultant wet cake, and the whole was filtered, washed with methanol, and dried, whereby the compound represented by the formula (α) was obtained:

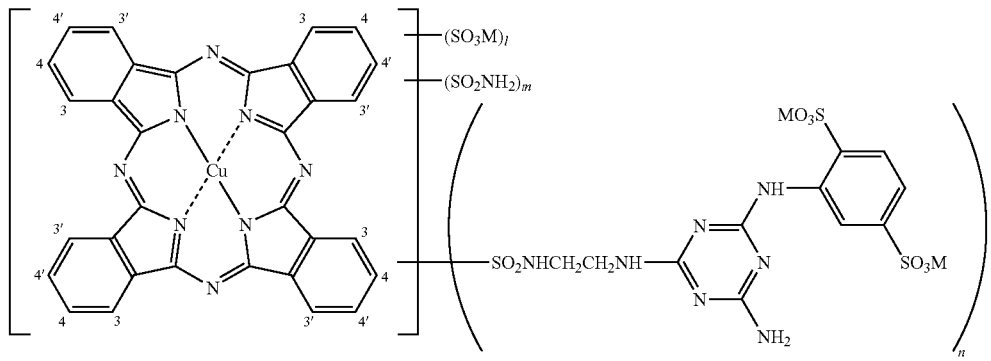

Cyan Dye 1 where l=0 to 2, m=1 to 3, and n=1 to 3 provided that l+m+n=3 or 4 and m≧1, the substitution position of a substituent is 4- or 4'-position, and M represents Na.

(Magenta Dye 1)

A compound represented by the following formula (γ), sodium carbonate, and benzoyl ethyl acetate ester were reacted with one another in xylene, and a reactant was filtered and washed. The resultant was reacted with meta-amino acetonitride, copper acetate, and sodium carbonate sequentially loaded into N,N-dimethylformamide, and a reactant was filtered and washed. Further, the resultant was sulfonated in fuming sulfuric acid, filtered, and washed. The resultant was subjected to a condensation reaction with cyanuric chloride in the presence of sodium hydroxide. Anthranilic acid was added to the reaction liquid, and the whole was subjected to a condensation reaction in the presence of sodium hydroxide. The resultant was filtered and washed, whereby a colorant to be used in examples, that is, Magenta Dye 1 represented by the following formula was obtained.

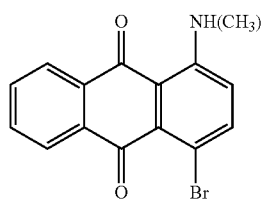

Formula (Y)

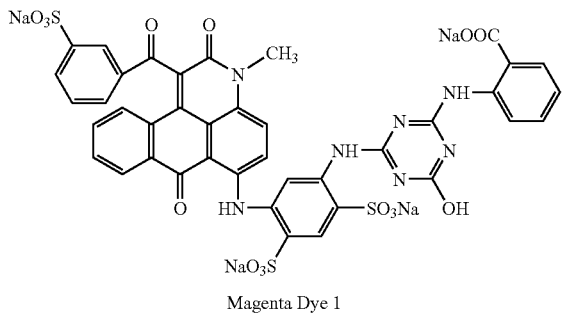

Magenta Dye 1

<Example 1 and Comparative Example 1

A mixed liquid of 54 parts of a 10% aqueous solution of Magenta Dye 1 (50 mmol/l in terms of a dye pure content) and 46 parts of water was prepared. Then, a sample (measuring 11 mm long by 5 mm wide) obtained by forming an SiN layer having a thickness of 400 nm on a silicon wafer and 30 g of the liquid prepared in the foregoing and containing Magenta Dye 1 were loaded into a closed vessel. The sample was immersed in the liquid and stored at a temperature of 60° C. for 1 week. After the storage, the sample was taken out, washed with pure water, and dried, and then the thickness of the SiN layer was measured by using a non-contact type thickness measuring apparatus (trade name: NANOSPEC/AFT Model 210, manufactured by Nanometorics Japan, Ltd.). The result of the measurement confirmed that Magenta Dye 1 was a substance that dissolved the SiN layer serving as a protective layer because the thickness of the SiN layer reduced by 5% or more after the storage as compared to the thickness before the storage.

Next, various components shown in Table 2 below were added in predetermined amounts shown in the table, and water was used to adjust the total amount of the components and water to 100 parts. Those components were mixed and sufficiently stirred for dissolution. After that, the resultant was filtered through a microfilter having a pore size of 0.2 μm (manufactured by Fuji Photo Film Co., Ltd.) under pressure, whereby each of Magenta Ink M1 and Magenta Ink M2 was prepared.

TABLE 2

Composition of magenta ink (unit: parts)

| | M1 | M2 |
|---|---|---|
| Glycerin | 4 | 4 |
| Ethylene glycol | 8 | 8 |
| 2-pyrrolidone | 5 | — |
| 1,5-pentanediol | 5 | 5 |
| Ethylene urea | 5 | — |
| Acetylenol E100 | 0.8 | 0.8 |
| Magenta Dye 1 | 6 | 6 |
| Water | Balance | Balance |

Table 3 shows magenta inks corresponding to Example 1 and Comparative Example 1, and the total amount of 2-pyrrolidone and ethylene urea each corresponding to a compound represented by the general formula (1) or the general formula (2) to be incorporated into each of the inks.

TABLE 3

Main composition of ink of each of Example 1 and Comparative Example 1

| | Example 1 | Comparative Example 1 |
|---|---|---|
| Ink | M1 | M2 |
| Total amount of 2-pyrrolidone and ethylene urea (% by mass) | 10 | 0 |

Magenta Ink M1 and Magenta Ink M2 corresponding to Example 1 and Comparative Example 1, respectively, were stored one by one in the ink cartridge shown in FIG. 1, and the driving pulse with which the ink cartridge was able to eject ink when used in the recording apparatus shown in FIG. 7 was measured. The measured driving pulse was defined as a driving pulse Pth0 in initial printing. After that, a surface of the ink cartridge in which an ejection opening was arranged was sealed with a sealing tape. Then, the ink cartridge was stored in the physical distribution container of a blister pack in such a manner that the cartridge would be sealed, and was kept in a thermostat at a temperature of 60° C. for 30 days.

The head of each of the ink cartridges used in the examples and the comparative examples includes a nozzle train in which 192 nozzles H2112 each ejecting 5 pl of ink per 1 dot are arranged in a straight line at an interval of 600 dpi for one color. The head further includes a nozzle train in which 192 nozzles H2112 each ejecting 2 pl of ink per 1 dot are arranged in a straight line at an interval of 600 dpi. In the head used, nozzle train pairs were arranged in parallel with one another for three colors, the nozzle train pairs each being composed of two nozzle trains as described above arranged on both ends of the common liquid chamber H2111 so as to be opposite to each other. At that time, a ratio of the volume of the ink liquid chamber of each nozzle to the surface area of a part of the protective layer of each nozzle part with which ink contacted was 14 μm$^3$/μm$^2$ irrespective of whether the nozzle was capable of ejecting 5 pl of ink or 2 pl of ink. The above-mentioned protective layer to be used of the head was constituted of a material mainly composed of silicon nitride, and had a thickness of 300 nm. In addition, a material for the ink supplying/holding member H1501 was an alloy of a styrene-based material and polyphenylene ether, and a material for each of the ink absorption members H1601, H1602, and H1603 was polypropylene. After the head had been stored (i.e., kept), the driving pulse with which the ink cartridge was able to eject ink was measured, and the measured driving pulse was represented by Pth1. The rate α of change in driving pulse before and after the storage described above was calculated and judged on the basis of the following criteria. Table 4 summarizes the results.

The rate α of change in driving pulse was determined in accordance with the following equation (D), and the resultant value for the rate α of change was judged on the basis of the following criteria.

$$\alpha(\%) = 100 \times (Pth1 - Pth0)/Pth0 \quad (D)$$

AA: The rate α of change before and after storage is less than 10%.

A: The rate α of change before and after storage is 10% or more and less than 20%.

B: The rate α of change before and after storage is 20% or more and less than 30%.

C: The rate α of change before and after storage is 30% or more.

TABLE 4

Results of evaluation for change in driving pulse

|  | Example 1 | Comparative example 1 |
|---|---|---|
| Change in driving pulse | A | B |

Magenta Ink M1 of Example 1 and Magenta Ink M2 of Comparative Example 1 each contain Magenta Dye 1, and are identical to each other in concentration of the dye. The result of the foregoing test has confirmed that Magenta Dye1 is a substance that dissolves an SiN layer. An SiN layer is used in the protective layer of the head used in the above-mentioned printing test. In addition, the Magenta Ink M1 of Example 1, and the Magenta Ink M2 of Comparative Example 1, are discriminated from each other depending on whether 2-pyrrolidone and ethylene urea each corresponding to a compound represented by the general formula (1) or the general formula (2) described above are incorporated into the composition of each of the inks. Therefore, the results of Table 4 confirmed that, when ink contained a substance that would dissolve a protective layer, a reduction in change in driving pulse was attained by incorporating a compound represented by the general formula (1) or the general formula (2) described above into the ink.

Examples 2 to 20 and Comparative Examples 2 to 7

A mixed liquid of 0.013 part of trisodium citrate which is a sodium salt of a polycarboxylic acid (50 mmol/l) and 99.987 parts of water was prepared. Then, a sample (measuring 11 mm long by 5 mm wide) obtained by forming an SiN layer having a thickness of 400 nm on a silicon wafer and 30 g of the liquid prepared in the foregoing and containing trisodium citrate were loaded into a closed vessel. The sample was immersed in the liquid and stored at a temperature of 60° C. for 1 week. After the storage, the sample was taken out, washed with pure water, and dried, and then the thickness of the SiN layer was measured by using a non-contact type thickness measuring apparatus (trade name: NANOSPEC/AFT Model 210, manufactured by Nanometorics Japan, Ltd.). The result of the measurement confirmed that trisodium citrate was a substance that dissolved the SiN layer serving as a protective layer because the thickness reduced by 5% or more after the storage as compared to the thickness before the storage.

Next, various components shown in each of Tables 5-1 to 5-5 were added in predetermined amounts shown in each of the tables, and water was mixed into the components in such a manner that the total amount of the components and water would be 100 parts. Then, the resultant was sufficiently stirred for dissolution. After that, the resultant was filtered through a microfilter having a pore size of 0.2 μm (manufactured by Fuji Photo Film Co., Ltd.) under pressure, whereby each of Cyan Inks C1 to C25 was prepared.

TABLE 5-1

Composition of each of Cyan Inks C1 to C5 (unit: parts)

|  | C1 | C2 | C3 | C4 | C5 |
|---|---|---|---|---|---|
| Glycerin | 5 | 5 | 5 | 5 | 5 |
| Ethylene glycol | 7 | 7 | 7 | 7 | 7 |
| 2-pyrrolidone | 4 | — | — | 5 | 10 |
| 1,5-pentanediol | 5 | 5 | 5 | 5 | 5 |
| Ethylene urea | 5 | 3 | 3 | 10 | 15 |
| Acetylenol E100 | 0.8 | 0.8 | 0.8 | 0.8 | 0.8 |
| Cyan Dye 1 | 6 | 6 | 6 | 6 | 6 |
| Trisodium citrate | 0.0008 | 0.00026 | 0.0034 | 0.0065 | 0.009 |
| Water | Balance | Balance | Balance | Balance | Balance |

TABLE 5-2

Composition of each of Cyan Inks C6 to C10 (unit: parts)

|  | C6 | C7 | C8 | C9 | C10 |
|---|---|---|---|---|---|
| Glycerin | 5 | 5 | 5 | 5 | 5 |
| Ethylene glycol | 7 | 7 | 7 | 7 | 7 |
| 2-pyrrolidone | 10 | 5 | — | 5 | 10 |
| 1,5-pentanediol | 5 | 5 | 5 | 5 | 5 |
| Ethylene urea | 15 | 10 | 2 | 10 | 15 |
| Acetylenol E100 | 0.8 | 0.8 | 0.8 | 0.8 | 0.8 |
| Cyan Dye 1 | 6 | 6 | 6 | 6 | 6 |
| Trisodium citrate | 0.00039 | 0.00039 | 0.00003 | 0.0067 | 0.0093 |
| Water | Balance | Balance | Balance | Balance | Balance |

TABLE 5-3

Composition of each of Cyan Inks C11 to C15 (unit: parts)

|  | C11 | C12 | C13 | C14 | C15 |
|---|---|---|---|---|---|
| Glycerin | 5 | 5 | 5 | 5 | 5 |
| Ethylene glycol | 7 | 7 | 7 | 7 | 7 |
| 2-pyrrolidone | 10 | 10 | 5 | — | 10 |
| 1,5-pentanediol | 5 | 5 | 5 | 5 | 5 |
| Ethylene urea | 16 | 15 | 10 | 3 | 10.5 |
| Acetylenol E100 | 0.8 | 0.8 | 0.8 | 0.8 | 0.8 |
| Cyan Dye 1 | 6 | 6 | 6 | 6 | 6 |
| Trisodium citrate | 0.00026 | 0.00023 | 0.00003 | 0.00003 | 0.013 |
| Water | Balance | Balance | Balance | Balance | Balance |

TABLE 5-4

Composition of each of Cyan Inks C16 to C20 (unit: parts)

|  | C16 | C17 | C18 | C19 | C20 |
|---|---|---|---|---|---|
| Glycerin | 5 | 5 | 5 | 5 | 5 |
| Ethylene glycol | 7 | 7 | 7 | 7 | 7 |
| 2-pyrrolidone | 10 | 10 | 10 | 10 | — |
| 1,5-pentanediol | 5 | 5 | 5 | 5 | 5 |
| Ethylene urea | 20 | 20 | 10.5 | 20 | — |
| Acetylenol E100 | 0.8 | 0.8 | 0.8 | 0.8 | 0.8 |
| Cyan Dye 1 | 6 | 6 | 6 | 6 | 6 |
| Trisodium citrate | 0.0178 | 0.00003 | 0.0132 | 0.018 | 0 |
| Water | Balance | Balance | Balance | Balance | Balance |

TABLE 5-5

Composition of each of Cyan Inks C21 to C25 (unit: parts)

|  | C21 | C22 | C23 | C24 | C25 |
|---|---|---|---|---|---|
| Glycerin | 5 | 5 | 5 | 5 | 5 |
| Ethylene glycol | 7 | 7 | 7 | 7 | 7 |
| 2-pyrrolidone | 15 | 15 | 10 | 5 | — |
| 1,5-pentanediol | 5 | 5 | 5 | 5 | 5 |
| Ethylene urea | 16 | 16 | 15 | 10 | 3 |
| Acetylenol E100 | 0.8 | 0.8 | 0.8 | 0.8 | 0.8 |
| Cyan Dye 1 | 6 | 6 | 6 | 6 | 6 |
| Trisodium citrate | 0.0178 | 0 | 0 | 0 | 0 |
| Water | Balance | Balance | Balance | Balance | Balance |

Tables 6-1 to 6-5 show: cyan inks corresponding to Examples 2 to 20 and Comparative Examples 2 to 7; the total amount of 2-pyrrolidone and ethylene urea each of which corresponds to a compound represented by the general formula (1) or the general formula (2) described above and is incorporated into each of the inks; and the amount of trisodium citrate as a polycarboxylic acid. It should be noted that each of Comparative Examples 4 to 7 is an example in which ink is free of a substance that dissolves a protective layer.

TABLE 6-1

Main composition of ink of each of Examples 2 to 6

|  | Example 2 | Example 3 | Example 4 | Example 5 | Example 6 |
|---|---|---|---|---|---|
| Ink | C1 | C2 | C3 | C4 | C5 |
| Total amount of 2-pyrrolidone and ethylene urea (% by mass) | 9 | 3 | 3 | 15 | 25 |
| Amount of trisodium citrate (mmol/l) | 0.031 | 0.010 | 0.13 | 0.25 | 0.35 |

TABLE 6-2

Main composition of ink of each of Examples 7 to 11

|  | Example 7 | Example 8 | Example 9 | Example 10 | Example 11 |
|---|---|---|---|---|---|
| Ink | C6 | C7 | C8 | C9 | C10 |
| Total amount of 2-pyrrolidone and ethylene urea (% by mass) | 25 | 15 | 2 | 15 | 25 |
| Amount of trisodium citrate (mmol/l) | 0.015 | 0.015 | 0.0012 | 0.26 | 0.36 |

TABLE 6-3

Main composition of ink of each of Examples 12 to 16

|  | Example 12 | Example 13 | Example 14 | Example 15 | Example 16 |
|---|---|---|---|---|---|
| Ink | C11 | C12 | C13 | C14 | C15 |
| Total amount of 2-pyrrolidone and ethylene urea (% by mass) | 26 | 25 | 15 | 3 | 20.5 |
| Amount of trisodium citrate (mmol/l) | 0.010 | 0.0089 | 0.0012 | 0.0012 | 0.50 |

TABLE 6-4

Main composition of ink of each of Examples 17 to 20 and Comparative Example 2

|  | Example 17 | Example 18 | Example 19 | Example 20 | Comparative Example 2 |
|---|---|---|---|---|---|
| Ink | C16 | C17 | C18 | C19 | C20 |
| Total amount of 2-pyrrolidone and ethylene urea (% by mass) | 30 | 30 | 20.5 | 30 | 0 |
| Amount of trisodium citrate (mmol/l) | 0.69 | 0.0012 | 0.51 | 0.70 | 0 |

TABLE 6-5

Main composition of ink of each of Comparative Examples 3 to 7

|  | Comparative example 3 | Comparative example 4 | Comparative example 5 | Comparative example 6 | Comparative example 7 |
|---|---|---|---|---|---|
| Ink | C21 | C22 | C23 | C24 | C25 |
| Total amount of 2-pyrrolidone and ethylene urea (% by mass) | 31 | 31 | 25 | 15 | 3 |
| Amount of trisodium citrate (mmol/l) | 0.69 | 0 | 0 | 0 | 0 |

Those inks of Examples 2 to 20 and Comparative Examples 2 to 7 were stored one by one in the ink cartridge shown in FIG. 1, and the driving pulse with which the ink cartridge was able to eject each ink when used in the recording apparatus shown in FIG. 7 was measured. The measured driving pulse was defined as a driving pulse Pth0. Pulse setting was performed in such a manner that a driving pulse Pop having a pulse width 1.2 times as large as that of the driving pulse Pth0 would be applied to each nozzle, and then an initial nozzle check pattern was printed. After that, a surface in which an ejection opening was arranged was sealed with a sealing tape. Then, the ink cartridge was stored in the physical distribution container of a blister pack in such a manner that the cartridge would be sealed, and was kept in a thermostat at a temperature of 60° C. for 30 days. The head of each of the ink cartridges to be used in Examples 2 to 20 and Comparative Examples 2 to 7 includes a nozzle train in which 192 nozzles H2112 each ejecting 5 pl of ink per 1 dot are arranged in a straight line at an interval of 600 dpi for one color. The head further includes a nozzle train in which 192 nozzles H2112 each ejecting 2 pl of ink per 1 dot are arranged in a straight line at an interval of 600 dpi. In the head used, nozzle train pairs were arranged in parallel with one another for three colors, the nozzle train pairs each being composed of two nozzle trains as described above arranged on both ends of the common liquid chamber H2111 so as to be opposite to each other. At that time, a ratio of the volume of the ink liquid chamber of each nozzle to the surface area of a part of the protective layer of each nozzle part with which ink contacted was 14 $\mu m^3/\mu m^2$ irrespective of whether the nozzle was capable of ejecting 5 pl of ink or 2 pl of ink.

The above-mentioned protective layer of the head used in the foregoing was constituted of a material mainly composed of silicon nitride, and had a thickness of 300 nm. In addition, a material for the ink supplying/holding member H1501 was an alloy of a styrene-based material and polyphenylene ether, and a material for each of the ink absorption members H1601, H1602, and H1603 was polypropylene.

After the keeping, the driving pulse with which each ink cartridge was able to eject ink was similarly measured, and the measured driving pulse was represented by Pth1. After that, pulse setting was performed in such a manner that the driving pulse Pop would be applied to each nozzle, and then a nozzle check pattern after storage was printed. The pattern was examined for presence or absence of printing misalignment as compared to an initial print. Further, images each having a duty of 7.5% were continuously printed until ink in an ink tank was used up under the same driving condition. In this case, the check patterns of all nozzles were printed every time 100 images were printed, and judgment as to whether printing blurring or printing misalignment occurred before the ink in the tank was used up was performed.

In addition, investigations into sticking resilience and intermittent printing property were performed by using the ink tank stored under the same condition. The investigation into the sticking resilience was performed as described below. After the ink tank stored under the above-mentioned condition had been mounted on the main body of the apparatus, the check patterns of all nozzles were printed and kept in a thermostat at 35° C. for 14 days in an uncapped state. After the keeping, the ink tank was mounted, and the check patterns of all nozzles were printed. When a nozzle ejecting no ink was present, an operation for recovering the nozzle suction force of the main body of the apparatus was performed, and then the check patterns of all nozzles were printed again. The operation was repeated until no nozzle failed to eject ink. The investigation into the intermittent printing property was performed as described below. After a printer had been left under the conditions of a temperature of 15° C. and a relative humidity of 10% for 5 hours or longer, an ink droplet was ejected under the environment and a nozzle was not used for 5 seconds. Next, an ink droplet was ejected from the nozzle so that printing was performed on a recording medium (trade name: HR-101; manufactured by Canon Inc.), and the resultant recorded article was visually evaluated for degree of quality. The printing misalignment, printing durability, and ejection reliability after the storage described above were judged on the basis of the following criteria. Tables 7-1 to 7-3 summarize the results.

(Printing Misalignment After Storage)

Judgment was performed on the basis of the following criteria.

A: Nearly no printing misalignment as compared to the initial print is observed.

B: Slight printing misalignment as compared to the initial print is observed.

C: Printing misalignment as compared to the initial print occurs.

(Printing Durability [Printing Blurring])

Judgment was performed on the basis of the following criteria.

A: No printing blurring occurs until the ink in the ink tank is used up.

C: Printing blurring occurs before the ink in the ink tank is used up.

(Printing Durability [Printing Misalignment])

Judgment was performed on the basis of the following criteria.

A: No printing misalignment occurs until the ink in the ink tank is used up.

B: Slight printing misalignment occurs before the ink in the ink tank is used up.

C: Printing misalignment occurs before the ink in the ink tank is used up.

(Reliability [Sticking Resilience])

Judgment was performed on the basis of the following criteria.

A: After the ink tank has been mounted, no nozzle fails to eject ink within three times of the operation for recovering the nozzle suction force of the main body.

C: After the ink tank has been mounted, not all ejection nozzles are recovered within three times of the operation for recovering the nozzle suction force of the main body.

(Reliability [Intermittent Printing Property])

Judgment was performed on the basis of the following criteria.

A: Normal printing can be performed.

B: Slight disturbance of a letter is observed.

C: A nozzle ejecting no ink is present, or the disturbance of printing is observed.

TABLE 7-1

Results of evaluation of Examples 2 to 11

| | | Example | | | | | | | | | |
|---|---|---|---|---|---|---|---|---|---|---|---|
| | | 2 | 3 | 4 | 5 | 6 | 7 | 8 | 9 | 10 | 11 |
| Change in driving pulse | | AA | AA | AA | AA | AA | AA | AA | AA | A | A |
| Printing misalignment after storage | | A | A | A | A | A | A | A | B | A | A |
| Printing durability | Printing blurring | A | A | A | A | A | A | A | A | A | A |
| | Printing misalignment | A | A | A | A | A | A | A | B | A | A |
| Ejection reliability | Sticking property | A | A | A | A | A | A | A | A | A | A |
| | Intermittent ejection property | A | A | A | A | A | A | A | A | A | A |

TABLE 7-2

Results of evaluation of Examples 12 to 20

| | | Example | | | | | | | | |
|---|---|---|---|---|---|---|---|---|---|---|
| | | 12 | 13 | 14 | 15 | 16 | 17 | 18 | 19 | 20 |
| Change in driving pulse | | AA | AA | AA | AA | A | A | AA | B | B |
| Printing misalignment after storage | | A | B | B | B | A | A | B | A | A |
| Printing durability | Printing blurring | A | A | A | A | A | A | A | A | A |
| | Printing misalignment | A | B | B | B | A | A | B | A | A |
| Ejection reliability | Sticking property | A | A | A | A | A | A | A | A | A |
| | Intermittent ejection property | B | A | A | A | A | B | B | A | B |

TABLE 7-3

Results of evaluation of Comparative Examples 2 to 7

| | | Comparative example | | | | | |
|---|---|---|---|---|---|---|---|
| | | 2 | 3 | 4 | 5 | 6 | 7 |
| Change in driving pulse | | AA | C | AA | AA | AA | AA |
| Printing misalignment after storage | | C | A | C | C | C | C |
| Printing durability | Printing blurring | A | A | A | A | A | A |
| | Printing misalignment | C | A | C | C | C | C |
| Ejection reliability | Sticking property | C | A | A | A | A | A |
| | Intermittent ejection property | C | C | C | A | A | A |

The results of Tables 7-1 to 7-3 confirmed that, when ink contained a polycarboxylic acid (that is, trisodium citrate) as a substance that dissolves a protective layer, the ink was able to obtain preferable performance by containing predetermined amounts of a compound represented by the general formula (1) or (2) (that is, the total amount of 2-pyrrolidone and ethylene urea) and the polycarboxylic acid in itself.

(Examples 21 and 22 and Reference Example 1

Various components shown in Table 8 below were added in predetermined amounts shown in the table, and water was mixed to adjust the total amount of the components to 100 parts. Those components were then sufficiently stirred for dissolution. After that, the resultant was filtered through a microfilter having a pore size of 0.2 μm (manufactured by Fuji Photo Film Co., Ltd.) under pressure, whereby each of Cyan Ink C26 to C28, Magenta Ink M3, and Yellow Ink Y1 was prepared.

TABLE 8

Composition of each of Cyan Inks C26 to C28, Magenta Ink M3, and Yellow Ink Y1 (unit: parts)

| | C26 | C27 | C28 | M3 | Y1 |
|---|---|---|---|---|---|
| Glycerin | 5 | 5 | 5 | 4 | 8 |
| Ethylene glycol | 7 | 7 | 7 | 8 | 8 |
| 2-pyrrolidone | 10 | 10 | 10 | 10 | 15 |
| 1,5-pentanediol | 5 | 5 | 5 | 5 | — |
| Ethylene urea | 11 | 12 | 14 | 15 | 15 |
| Acetylenol E100 | 0.8 | 0.8 | 0.8 | 0.8 | 0.8 |
| Cyan Dye 1 | 6 | 6 | 6 | — | — |
| Magenta Dye 1 | — | — | — | 6 | — |

TABLE 8-continued

Composition of each of Cyan Inks C26 to C28, Magenta Ink M3, and Yellow Ink Y1 (unit: parts)

|  | C26 | C27 | C28 | M3 | Y1 |
|---|---|---|---|---|---|
| C.I. Direct Yellow 132 | — | — | — | — | 3 |
| Trisodium citrate | 0.0132 | 0.0132 | 0.0132 | 0.0132 | 0.0132 |
| Water | Balance | Balance | Balance | Balance | Balance |

The respective inks of Cyan Inks C26 to C28, Magenta Ink M3, and Yellow Ink Y1 prepared in the foregoing were combined as shown in Table 9, whereby ink sets were obtained. Table 9 shows: ink sets corresponding to Examples 21 and 22, and Reference Example 1; the total amount of 2-pyrrolidone and ethylene urea each of which is a compound represented by the general formula (1) described above to be incorporated into each of the inks of which these ink sets are constituted; the amount of trisodium citrate as a polycarboxylic acid; and the largest difference in amount of the compound represented by the general formula (1) or (2) described above in each set.

TABLE 9

Main constitution of ink set of each of Reference Example 1 and Examples 21 and 22

|  | Reference Example 1 | | | Example 21 | | | Example 22 | | |
|---|---|---|---|---|---|---|---|---|---|
| Ink | C26 | M3 | Y1 | C27 | M3 | Y1 | C28 | M3 | Y1 |
| Total amount of 2-pyrrolidone and ethylene urea (% by mass) | 21 | 25 | 30 | 22 | 25 | 30 | 24 | 25 | 30 |
| Content of trisodium citrate (mmol/l) | 0.51 | 0.51 | 0.51 | 0.51 | 0.51 | 0.51 | 0.51 | 0.51 | 0.51 |
| Largest difference in amount of 2-pyrrolidone and ethylene urea (%) |  | 9 |  |  | 8 |  |  | 6 |  |

The respective inks of which those ink sets of Examples 21 and 22, and Reference Example 1 were constituted were stored one by one in the ink cartridge shown in FIG. 1, and the driving pulse with which the ink cartridge was able to eject each ink when used in the recording apparatus shown in FIG. 7 was measured. The measured driving pulse was defined as a driving pulse Pth0 in initial printing. After that, pulse setting was performed in such a manner that a driving pulse Pop having a pulse width 1.2 times as large as that of the driving pulse Pth0 would be applied to each nozzle, and a CMY gray scale according to a process Bk was printed and defined as an initial print. After that, a surface in which an ejection opening was arranged was sealed with a sealing tape. Then, the ink cartridge was stored in the physical distribution container of a blister pack in such a manner that the cartridge would be sealed, and was kept in a thermostat at a temperature of 60° C. for 30 days. The head of each of the ink cartridges to be used in the examples and the reference examples includes a nozzle train in which 192 nozzles H2112 each ejecting 5 pl of ink per 1 dot are arranged in a straight line at an interval of 600 dpi for one color. The head further includes a nozzle train in which 192 nozzles H2112 each ejecting 2 pl of ink per 1 dot are arranged in a straight line at an interval of 600 dpi. In the head used, nozzle train pairs were arranged in parallel with one another for three colors, the nozzle train pairs each being composed of two nozzle trains as described above arranged on both ends of the common liquid chamber H2111 so as to be opposite to each other. At that time, a ratio of the volume of the ink liquid chamber of each nozzle to the surface area of a part of the protective layer of each nozzle part with which ink contacted was 14 $\mu m^3/\mu m^2$ irrespective of whether the nozzle was capable of ejecting 5 pl of ink or 2 pl of ink.

The above-mentioned protective layer of the head was constituted of a material mainly composed of silicon nitride, and had a thickness of 300 nm. In addition, a material for the ink supplying/holding member H1501 was an alloy of a styrene-based material and polyphenylene ether, and a material for each of the ink absorption members H1601, H1602, and H1603 was polypropylene.

After the keeping, a nozzle check pattern was printed by setting the driving pulse Pop as that in the initial condition, and pattern was examined for presence or absence of printing misalignment as compared to an initial print. Further, a CMY gray scale according to the process Bk was printed under the same driving condition, and was defined as a print after storage. Then, the driving pulse with which each ink cartridge was able to eject ink was similarly measured, and the measured driving pulse was represented by Pth1. Images each having a duty of 7.5% for each color were continuously printed until ink in an ink tank was used up with the driving pulse Pop. In this case, the check patterns of all nozzles were printed every time 100 images were printed, and judgment as to whether printing blurring or printing misalignment occurred before the ink in the tank was used up was performed.

In addition, investigations into sticking resilience and intermittent printing property were performed by using the ink tank stored under the same condition. The investigation into the sticking resilience was performed as described below. After the above-mentioned stored ink tank had been mounted on the main body of the apparatus, the check patterns of all nozzles were printed and kept in a thermostat at 35° C. for 14 days in an uncapped state. After the keeping, the ink tank was mounted, and the check patterns of all nozzles were printed. When a nozzle ejecting no ink was present, an operation for recovering the nozzle suction force of the main body of the apparatus was performed, and then the check patterns of all nozzles were printed again. The operation was repeated until no nozzle failed to eject ink. The investigation into the intermittent printing property was performed as described below. After a printer had been left under the conditions of a temperature of 15° C. and a relative humidity of 10% for 5 hours or longer, an ink droplet was ejected under the environment and a nozzle was not used for 5 seconds. Next, an ink droplet was ejected from the nozzle so that printing was performed on a recording medium (trade name: HR-101; manufactured by Canon Inc.), and the resultant recorded article was visually evaluated for degree of quality. The change in driving pulse after the storage, and the printing misalignment, printing durability, and ejection reliability after the storage described above were judged on the basis of the above-mentioned criteria. A change in color development property was judged on the basis of the following criteria. Table 10 summarizes the results.

(Change in Color Development Property)

Judgment was performed on the basis of the following criteria.

A: Nearly no change in gray scale before and after storage occurs.

B: A slight change in gray scale before and after storage occurs.

C: A change in gray scale before and after storage occurs.

TABLE 10

Results of evaluation of Reference Example 1 and Examples 21 and 22

|  |  | Reference Example 1 | | | Example 21 | | | Example 22 | | |
|---|---|---|---|---|---|---|---|---|---|---|
| Ink |  | C26 | M3 | Y1 | C27 | M3 | Y1 | C28 | M3 | Y1 |
| Change in color development property |  |  | B |  |  | A |  |  | A |  |
| Change in driving pulse |  | A | A | A | A | A | A | A | A | A |
| Printing misalignment after storage |  | A | A | A | A | A | A | A | A | A |
| Printing durability | Printing blurring | A | A | A | A | A | A | A | A | A |
|  | Printing misalignment | A | A | A | A | A | A | A | A | A |
| Ejection reliability | Sticking property | A | A | A | A | A | A | A | A | A |
|  | Intermittent ejection property | B | B | B | B | B | B | B | B | B |

Table 10 confirmed that, when a largest difference between the amount of the compound represented by the general formula (1) or (2) in any one of inks in an ink set and that in any one of the other inks in the ink set is 8 or less, an ink set showing no change in color development property and having preferable performance was able to be provided.

This application claims the benefit of Japanese Patent Application No. 2005-200982, filed Jul. 8, 2005, which is hereby incorporated by reference herein in its entirety.

What is claimed is:

1. An ink cartridge for storing ink, comprising a thermal ink-jet head provided with a heat generating portion that generates thermal energy for ejecting the ink from an ejection opening, wherein:

the heat generating portion has, on its surface in contact with the ink, a protective layer containing at least one selected from the group consisting of a silicon nitride and a silicon carbide; and the ink contains a substance that dissolves the protective layer and a compound represented by the following general formula (1), and a content X (% by mass) of the compound represented by the general formula (1) in the ink satisfies a relationship of $1 \leq X \leq 30$:

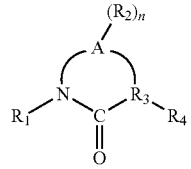

Formula (1)

where A represents an alkylene or alkenylene group having 1 to 4 carbon atoms which forms a ring with a nitrogen atom, a carbonyl group and $R_3$, $R_1$ and $R_4$ each independently represent any one of a hydrogen atom, a hydroxyl group, a substituted or unsubstituted alkyl group, a substituted or unsubstituted alkenyl group, a substituted or unsubstituted acyl group, a carbamoyl group, a substituted or unsubstituted carboxyl group, and a substituted or unsubstituted sulfonyl group, $R_2$ represents a group bonded to an arbitrary carbon atom of A, $R_2$ representing any one of a hydrogen atom, a hydroxyl group, a substituted or unsubstituted alkyl group, a substituted or unsubstituted alkenyl group, a substituted or unsubstituted acyl group, a carbamoyl group, a substituted or unsubstituted carboxyl group, and a substituted or unsubstituted sulfonyl group, n represents an integer of 0 to 4, and $R_3$ represents a carbon or nitrogen atom.

2. An ink cartridge according to claim 1, wherein the compound represented by the general formula (1) is represented by the following general formula (2):

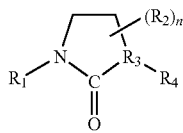

Formula (2)

where $R_1$ and $R_4$ each represent any one of a substituted or unsubstituted alkyl group having 1 to 4 carbon atoms, a hydrogen atom, a hydroxyl group, a carboxyl group, and a sulfonyl group, $R_2$ represents any one of a hydrogen atom, a hydroxyl group, a substituted or unsubstituted alkyl group having 1 to 4 carbon atoms, a carboxyl group, and a sulfonyl group to be bonded to a nitrogen atom, carbonyl group, or carbon atom except $R_3$ of which a five-membered ring is constituted, n represents an integer of 0 to 4, and $R_3$ represents a carbon or nitrogen atom.

3. An ink cartridge according to claim 1, wherein the substance that dissolves the protective layer comprises a polycarboxylic acid and a salt thereof, and a content Y (mmol/l) of the polycarboxylic acid and the salt thereof in the ink satisfies a relationship of $0.001 \leq Y \leq 0.02X \times 0.09$.

4. An ink cartridge according to claim 1, wherein the protective layer has a thickness of 50 nm or more to 500 nm or less.

5. An ink cartridge according to claim 1, wherein the thermal ink-jet head has an ink liquid chamber, and a ratio of a volume of the ink liquid chamber to a surface area of a part of the protective layer in contact with the ink is 50 $\mu m^3/\mu m^2$ or less.

6. An ink for a thermal ink-jet head provided with a heat generating portion that generates thermal energy for ejecting the ink from an ejection opening, the heat generating portion having on its surface in contact with the ink, a protective layer containing at least one selected from the group consisting of a silicon nitride and a silicon carbide, the ink comprising a substance that dissolves the protective layer and a compound represented by the following general formula (1), wherein a content X (% by mass) of the compound represented by the general formula (1) in the ink satisfies a relationship of $1 \leq X \leq 30$:

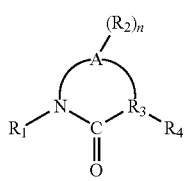

Formula (1)

where A represents an alkylene or alkenylene group having 1 to 4 carbon atoms which forms a ring with a nitrogen atom, a carbonyl group and $R_3$, $R_1$ and $R_4$ each independently represent any one of a hydrogen atom, a hydroxyl group, a substituted or unsubstituted alkyl group, a substituted or unsubstituted alkenyl group, a substituted or unsubstituted acyl group, a carbamoyl group, a substituted or unsubstituted carboxyl group, and a substituted or unsubstituted sulfonyl group, $R_2$ represents a group bonded to an arbitrary carbon atom of A, $R_2$ representing any one of a hydrogen atom, a hydroxyl group, a substituted or unsubstituted alkyl group, a substituted or unsubstituted alkenyl group, a substituted or unsubstituted acyl group, a carbamoyl group, a substituted or unsubstituted carboxyl group, and a substituted or unsubstituted sulfonyl group, n represents an integer of 0 to 4, and $R_3$ represents a carbon or nitrogen atom.

7. An ink cartridge according to claim 1, wherein the ejection opening and the heat generating portion are arranged so as to be opposite to each other.

8. An ink cartridge according to claim 1, wherein the substance that dissolves the protective layer is selected from the group consisting of the following compound (3) and a polycarboxylic acid and a salt thereof:

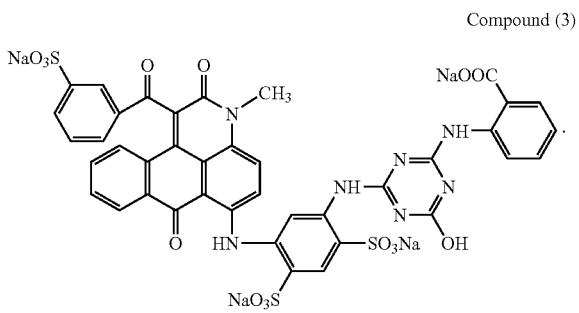

Compound (3)

9. An ink cartridge according to claim 1, wherein the substance that dissolves the protective layer is selected from the group consisting of the following compound (4) and a polycarboxylic acid and a salt thereof:

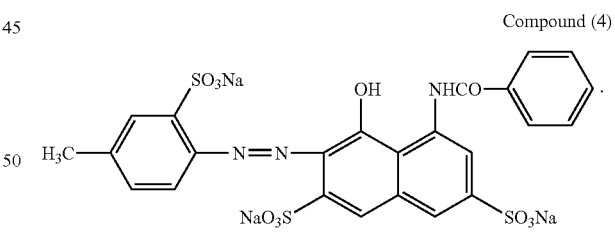

Compound (4)

* * * * *